US011078427B2

(12) United States Patent
White et al.

(10) Patent No.: US 11,078,427 B2
(45) Date of Patent: Aug. 3, 2021

(54) METHODS AND DEVICES FOR PRODUCING BIODIESEL, DIESEL-RANGE HYDROCARBONS, AND PRODUCTS OBTAINED THEREFROM

(71) Applicant: Renewable Energy Group, Inc., Ames, IA (US)

(72) Inventors: James Matthew White, Boone, IA (US); David A. Slade, Ames, IA (US); Martin R. Haverly, Ames, IA (US); Ramin Abhari, Bixby, OK (US); Cody J. Ellens, Ankeny, IA (US)

(73) Assignee: Renewable Energy Group, Inc., Ames, IA (US)

( * ) Notice: Subject to any disclaimer, the term of this patent is extended or adjusted under 35 U.S.C. 154(b) by 0 days.

(21) Appl. No.: 16/400,777

(22) Filed: May 1, 2019

(65) Prior Publication Data

US 2019/0338219 A1    Nov. 7, 2019

Related U.S. Application Data

(60) Provisional application No. 62/666,503, filed on May 3, 2018.

(51) Int. Cl.
    *C10G 3/00*    (2006.01)
    *C11C 3/00*    (2006.01)
    (Continued)

(52) U.S. Cl.
    CPC ............. *C10G 3/42* (2013.01); *C10G 3/50* (2013.01); *C10G 65/12* (2013.01); *C11C 1/025* (2013.01);
    (Continued)

(58) Field of Classification Search
    None
    See application file for complete search history.

(56) References Cited

U.S. PATENT DOCUMENTS

| 2,263,550 A | 11/1941 | Andrews |
| 3,335,154 A | 8/1967 | Smith |
| (Continued) | | |

FOREIGN PATENT DOCUMENTS

| WO | 2007147237 | 12/2007 |
| WO | 2015012538 | 1/2015 |

OTHER PUBLICATIONS

"Production of Biodiesel Using High Free Fatty Acid Feedstocks"—I.M. Atadashi et al. / Renewable and Sustainable Energy Reviews 16 (2012) 3275-3285.
(Continued)

*Primary Examiner* — Philip Y Louie
*Assistant Examiner* — Alyssa L Cepluch
(74) *Attorney, Agent, or Firm* — Nyemaster Goode, PC

(57) ABSTRACT

A process for producing crude biodiesel from renewable feedstocks (such as fats, oils, and greases) containing unsaponifiable materials; purifying the crude biodiesel through a purification process; recovering a purified biodiesel distillate stream and a less volatile biodiesel residue stream; and further recovering valuable chemicals from the biodiesel residue. Specifically, the present technology relates to the concentration of valuable chemicals in the biodiesel residue product of biodiesel production and the subsequent recovery of these valuable chemicals. The process may further include the conversion of the biodiesel residue into diesel range hydrocarbons using hydrodeoxygenation and the subsequent purification of the hydrocarbon fraction produced thereby.

37 Claims, 4 Drawing Sheets

(51) Int. Cl.
    *C11C 1/10*      (2006.01)
    *C11C 1/02*      (2006.01)
    *C10G 65/12*    (2006.01)
(52) U.S. Cl.
    CPC ............... *C11C 1/10* (2013.01); *C11C 3/003* (2013.01); *C10G 2300/1011* (2013.01); *C10G 2300/4006* (2013.01); *C10G 2300/4012* (2013.01)

(56) References Cited

U.S. PATENT DOCUMENTS

| | | | |
|---|---|---|---|
| 5,487,817 | A | 1/1996 | Fizet |
| 5,512,691 | A | 4/1996 | Barnicki et al. |
| 6,399,800 | B1 | 6/2002 | Haas et al. |
| 6,846,941 | B2 | 1/2005 | Rohr et al. |
| 7,767,837 | B2 | 8/2010 | Elliott |
| 8,212,062 | B2 | 7/2012 | Berry et al. |
| 8,735,637 | B2 | 5/2014 | Stigsson et al. |
| 9,957,464 | B2 | 5/2018 | Slade et al. |
| 2007/0010682 | A1* | 1/2007 | Myllyoja ............... C10G 45/58 554/174 |
| 2008/0163543 | A1* | 7/2008 | Abhari ................... C10G 45/60 44/308 |
| 2012/0255223 | A1 | 10/2012 | Kaul et al. |
| 2015/0353864 | A1 | 12/2015 | Vermeiren et al. |
| 2016/0108013 | A1* | 4/2016 | Piccirilli ................... C11B 3/00 549/506 |
| 2016/0122687 | A1 | 5/2016 | Piccirilli |
| 2016/0145536 | A1* | 5/2016 | Slade ...................... C10L 1/026 554/174 |
| 2018/0346831 | A1 | 12/2018 | Sutterlin et al. |

OTHER PUBLICATIONS

"Biodiesel Production from Oils and Fast with High Free Fatty Acids"—Transactions of the ASAE, vol. 44(6): 1429-1436, (2001).

"Efficient production of biodiesel from high free fatty acid-containing waste oils using various carbohydrate-derived solid acid catalysts"—W. Y. Lou et al. / Bioresource Technology 99 (2008) 8752-8758.

PCT/US19/30240 International Search Report & Written Opinion— dated Sep. 20, 2019.

Trading Rules for the Purchase of Soybean Oil—Adopted 1930, latest Amendment Oct. 2019.

Corn Oil by Corn Refiners Association—5th Edition 2006.

Shannon D. Sanford, James Matthew White, Parag S. Shah, Claudia Wee, Marlen A. Valverde and Glen R. Meier, "Feedstock and Biodiesel Characteristics Report", Nov. 17, 2009, 136 pages, Renewable Energy Group, Ames, Iowa, United States.

* cited by examiner

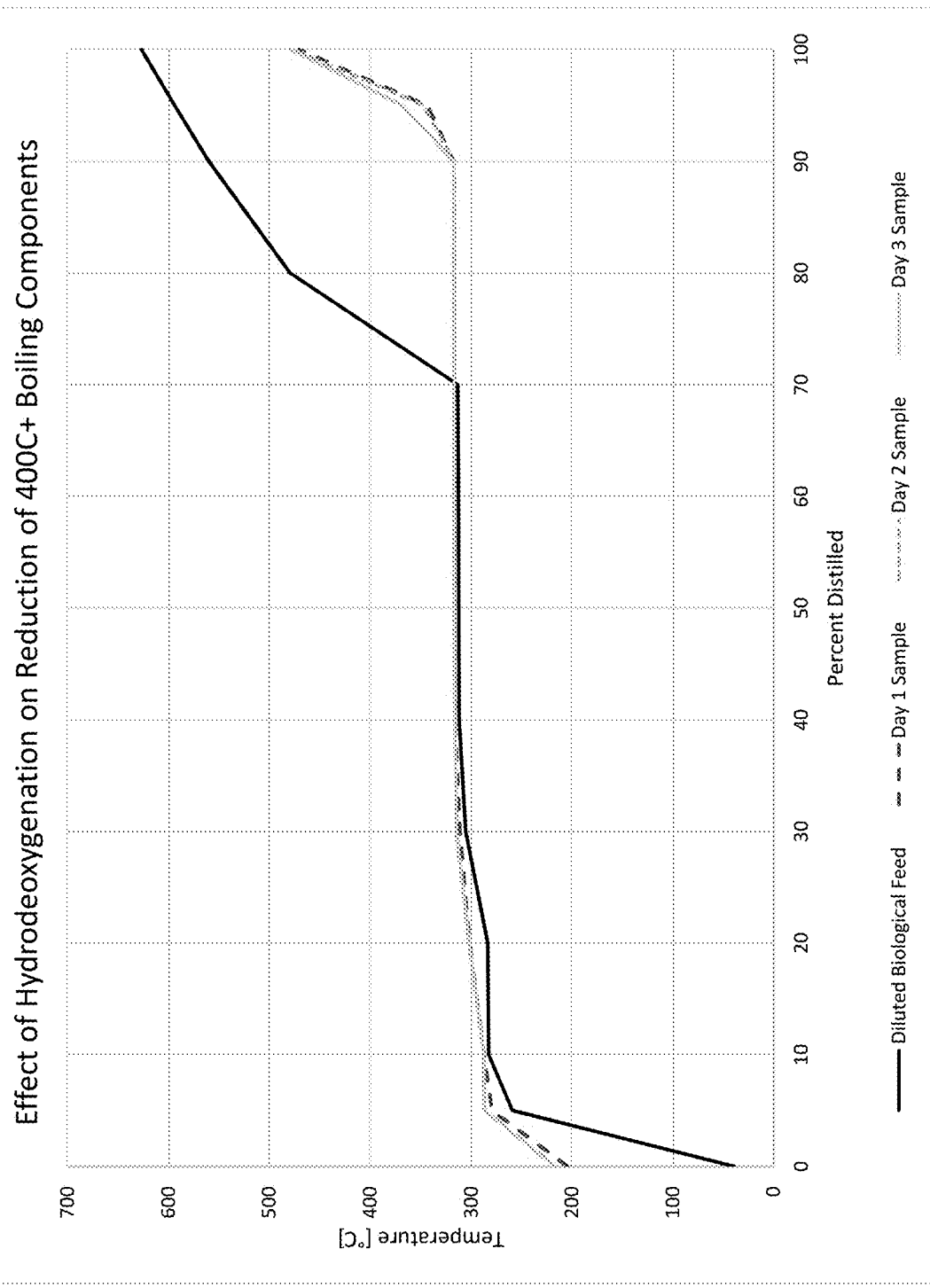

METHODS AND DEVICES FOR PRODUCING BIODIESEL, DIESEL-RANGE HYDROCARBONS, AND PRODUCTS OBTAINED THEREFROM

CROSS REFERENCE TO RELATED APPLICATION

This application is based upon U.S. Provisional Application Ser. No. 62/666,503 filed May 3, 2018, the complete disclosure of which is hereby expressly incorporated by this reference.

FIELD OF THE INVENTION

The present invention generally relates to processing vegetable oils and other lipid feedstocks into high quality biodiesel and simultaneously recovering valuable chemical co-products.

BACKGROUND

For many years, valuable chemicals present in plant oils have been recovered for pharmaceutical, nutritional and cosmetic applications. Valuable chemicals include sterols, steryl esters, steryl glucosides, terpenes, tocopherols, vitamins, flavonoids, carotenoids, sulfolipids, proteins, hydroxycinnamic acids, fatty acid myricyl esters, waxes, and other components present in very small quantities in plant and vegetable oils. Since most of the target valuable chemicals make up less than 2% of the initial oil it can be difficult to economically and efficiently isolate them.

In the past 50 years, two primary commercial sources of these valuable chemicals have emerged: one from vegetable oil refining and a second from tall oil production.

In vegetable oil refining, different crude oil processing steps are used to remove impurities including degumming, chemical refining, bleaching, and deodorization. During degumming, an acid solution is mixed with crude oil to hydrate gums. In chemical refining a basic solution is mixed with the crude oil to react with free fatty acids and form a soapstock. Both the soapstock and hydrated gums are removed from the crude oil by centrifugation. The crude oil is then further refined in bleaching and deodorization steps where sterols and tocopherols are also removed. Deodorization of crude oil occurs under high vacuum (1-8 mbar) and temperature (180-270° C.). After deodorization, the crude oil is largely free from impurities, contains mostly triglycerides and has been processed into a fully refined oil. The volatiles from deodorization are condensed into a deodorizer distillate product containing free fatty acids, unsaponifiables, and monoglycerides. The unsaponifiables are primarily comprised of tocopherols, sterols, terpenes, and steryl esters.

The second commercial source of valuable chemicals is tall oil from the pulp and paper industry. In the sulfate or Kraft pulping process, wood chips are cooked in a mixture of sodium sulfide and sodium hydroxide. These chemicals dissolve the lignin and part of the hemicellulose leaving the cellulose fibers. Once the wood pulp is removed, the remaining liquid, called black liquor, contains lignin fragments, carbohydrates from the breakdown of cellulose, sodium carbonate, sodium sulfate, and inorganic salts. The black liquor is heated to evaporate liquids and concentrate solids. During this process, the alkaline mixture reacts with the fatty and resin acids in the black liquor forming a rosin soap that rises to the top and is skimmed off. The skimmed material is known as tall oil soap. The tall oil soap is then acidulated with a mineral acid producing an aqueous phase and an oil phase (crude tall oil). The crude tall oil contains unsaponifiables, free fatty acids, and resin acids. The unsaponifiables are made up of varying concentrations of waxes, alcohols, fatty acid esters, sterols, and steryl esters.

At this point, the recovery of valuable chemicals is largely the same for both the deodorizer distillate from vegetable oil refining and the crude tall oil from Kraft pulping processes. In both cases, valuable chemicals are further concentrated into the unsaponifiables by way of distillation and/or various chemical reactions including hydrolysis, esterification, saponification, acidulation, and physical separations such as filtration and solvent extraction.

For instance, U.S. Pat. No. 2,263,550 describes a process for separating non-saponifiable matter from crude fats and oils targeting the production of vitamin E (tocopherol) as well as sterols. The invention seeks to do so by converting the glycerides in the original feedstock to esters with the addition of an alcohol. The esters then have a lower boiling point than the original glycerides and can therefore be removed by distillation. The remaining residue containing vitamin E is concentrated by saponifying with alkali and finally extracting the product with ether, chloroform, ethylene dichloride, or other suitable solvents.

In U.S. Pat. No. 3,335,154, Smith describes a process for separating tocopherols and sterols from deodorizer distillate. The deodorizer distillate undergoes a saponification reaction to remove fatty acid esters. Then the distillate is acidulated resulting in a mixture of free fatty acids, free tocopherols, free sterols, glycerol, water, excess mineral acid, and alkali salts. The glycerol, water, and excess acid are removed by phase separation and then the oil phase is esterified with an alcohol and acid catalyst. At this point cold water is added to the mixture to crystalize the sterols which are subsequently removed by filtration. Finally the filter cake is rinsed with an acetone and alcohol solvent yielding a crystalline sterol product and the resulting filtrate is heated to remove the acetone and alcohol leaving a concentrated tocopherol residue.

In U.S. Pat. No. 5,487,817, Fizet describes another process for recovering tocopherols and sterols from deodorizer distillate. In this process the sterols are esterified with the fatty acids in the deodorizer distillate. The resulting mixture is then distilled twice, first to remove a majority of the fatty acids followed by a second, higher temperature distillation to remove a fatty acid mixture rich in tocopherols and non-esterified sterols. The steryl esters formed in the esterification reaction remain in the distillation bottoms. The distillate from the second distillation is then subjected to a second esterification reaction with methanol converting the fatty acids to methyl-esters in the presence of an acid catalyst. The tocopherols in the second esterification product are then recovered in an ion exchange resin by adsorption. A high purity concentration of tocopherols are desorbed from the ion exchange resins using acetic acid/isopropanol mixtures, and potassium hydroxide or sodium hydroxide which also regenerates the resin. The steryl esters (and a small amount of tocopherol esters) from the first esterification reaction and distillation bottoms are obtained by transesterification of the steryl esters (and tocopherol esters) with an alcohol and an acid catalyst. This yields sterols, tocopherols and fatty acid alkyl esters. The transesterification product is cooled to crystalize and filtered to recover the sterols.

In U.S. Pat. No. 5,512,691, Barnicki et al describe a process for creating a tocopherol concentrate from vegetable oil distillates. The distillate material is first esterified so that the sterols react with the free fatty acids present in the mixture to form steryl esters and any mono- and diglycerides are converted to triglycerides with the free fatty acids. Then, the mixture is subjected to a series of distillation steps. One step involves removing unreacted free fatty acids as distillate leaving a tocopherol-rich bottom. A second distillation removes a tocopherol-rich product as a second distillate leaving steryl esters and glycerides as a second bottoms product.

And in U.S. Pat. No. 6,846,941, Rohr et al. describe a process for separating unsaponifiable products from animal and vegetable feedstocks. The unsaponifiable material is obtained by first saponifying the feedstock into zinc, iron, manganese, magnesium, calcium, copper, lead, cobalt or aluminum soaps which have a lower melting point than potassium or sodium soaps. These soaps may be formed directly through saponification or by converting potassium and sodium soaps to the lower melting point soaps via ion exchange. After the lower melting point soaps have been dried, they go through a series of distillation steps to obtain the desired purity of unsaponifiable material, either as a distillate or residue (distillation bottoms). Further chromatography, filtration, and crystallization techniques may also be used to improve the purity of the unsaponifiable products.

One of the challenges with obtaining valuable chemicals from unsaponifiable material from either vegetable oil refining or Kraft pulping processes is that the valuable chemicals are present as minority components in byproduct streams from each process that contain significant impurities. Thus, high-capital equipment and complex refining processes are required to yield products that are sufficiently pure to justify a processing operation.

Although it is technically possible to obtain valuable chemicals from the unsaponifiable material from deodorizer distillates and crude tall oil, the commercial value of the relatively small quantity of final products obtained does not always justify the commercial-scale implementation of the equipment and processing required to purify them. Therefore, the availability of valuable chemicals including sterols, steryl esters, steryl glucosides, terpenes, tocopherols, vitamins, flavonoids, carotenoids, sulfolipids, proteins, hydroxycinnamic acids, fatty acid myricyl esters, waxes, and other components has been limited.

Simultaneously, as the biodiesel industry has matured, quality specifications for biodiesel have become more rigorous than anticipated by earlier designers of production processes and biodiesel economics have become more competitive. As a result, biodiesel producers have an urgent need to improve the economics of their production processes in order to remain economically viable, either by allowing the use of new and/or lower-cost feedstocks or by improving the value of their co-products or, preferably, both. However, lower-cost feedstocks often contain unsaponifiable material that can negatively impact biodiesel quality according to commercial biodiesel specifications including ASTM D6751-18, CAN/CGSB 3.524, and numerous customer-specific specifications. What is needed in the industry are methods that produce not only high-quality biodiesel that satisfies ever-tightening commercial expectations but also valuable co-products which can augment the ever-tightening economics of biodiesel production.

There is therefore a need for an invention which overcomes the economic and extensive processing limitations previously hindering the commercial-scale production of larger quantities of valuable chemicals present in unsaponifiable material in fats and oils by combining aspects of high-purity biodiesel production with commercial-scale processes for producing such valuable chemicals. Additional information about biodiesel production processes is described in Applicant's prior U.S. Pat. No. 9,957,464 issued on May 1, 2018 and hereby incorporated in its entirety by this reference.

SUMMARY

One aspect of the invention relates to a process for producing a purified biodiesel from a feedstock containing unsaponifiable material. The process includes introducing the feedstock to a pre-treatment process to create a pretreated feedstock then reacting the pretreated feedstock in a transesterification reactor with an alcohol to produce a crude biodiesel. The crude biodiesel is separated (purified) to produce a biodiesel residue comprising unsaponifiable material and a purified biodiesel. In some embodiments the separation step may include using at least one of cold filtration, membrane filtration, and resin filtration. In some embodiments the separation step may include distillation to produce a purified biodiesel and a distillation bottoms comprising unsaponifiable material. At least a portion of the unsaponifiable material is recovered. The unsaponifiable materials are recovered by solvent extraction. The unsaponifiable material may include at least one of the following valuable chemicals: sterols, steryl esters, steryl glucosides, terpenes, tocopherols, vitamins, myriciyl esters of fatty acids, sulfolipids, proteins, hydroxycinnamic acids, waxes, flavonoids, carotenoids. The process may further include removing at least one of the valuable chemicals from the unsaponifiable material using at least one of saponification, transesterification, esterification, hydrolysis, and solvent separation.

Another aspect of the invention relates to a process for producing hydrocarbons from a biological feedstock. The process includes diluting the biological feedstock with a hydrocarbon oil to produce a diluted biological feedstock then subjecting the diluted biological feedstock to a hydrodeoxygenation process by contacting the diluted biological feedstock with a hydrogen-rich gas and a catalyst at an elevated temperature and pressure to produce a reactor effluent. The reactor effluent is cooled to produce a cooled reactor effluent then a hydrocarbons fraction is recovered from the cooled reactor effluent. The biological feedstock comprises free fatty acids, fatty acid glyceride esters, and unsaponifiable material at concentrations greater than 2 wt %. In some embodiments the biological feedstock comprises a biodiesel residue such as distillation bottoms recovered from a biodiesel distillation process. In some embodiments the cooled reactor effluent is separated into a hydrocarbon phase, a gas phase, and an aqueous phase. In some embodiments a hydrocarbon stripper is used to separate the hydrocarbon phase into an overheads fraction and the hydrocarbons fraction. The hydrocarbons fraction may be added to a diesel fuel. In some embodiments the hydrocarbons fraction is further introduced to at least one of a hydrocracking and hydrpisomerization process to produce a renewable diesel fuel.

BRIEF DESCRIPTION OF THE DRAWINGS

The advantages of the technology described may be better understood by referring to the descriptions below with the accompanying drawings. The drawings are not to scale and represent exemplary configurations that depict general principles of the technology which are not meant to limit the scope of the invention. Dotted lines within the figures are representative of different embodiments which may be included as part of the process in some embodiments.

FIG. 4 is a graphical representation of the effect of hydrodeoxygenation on the concentration of 400° C.+ components (as measured by ASTM D2887-18) present in a biological feedstock.

DETAILED DESCRIPTION

Figure 1:
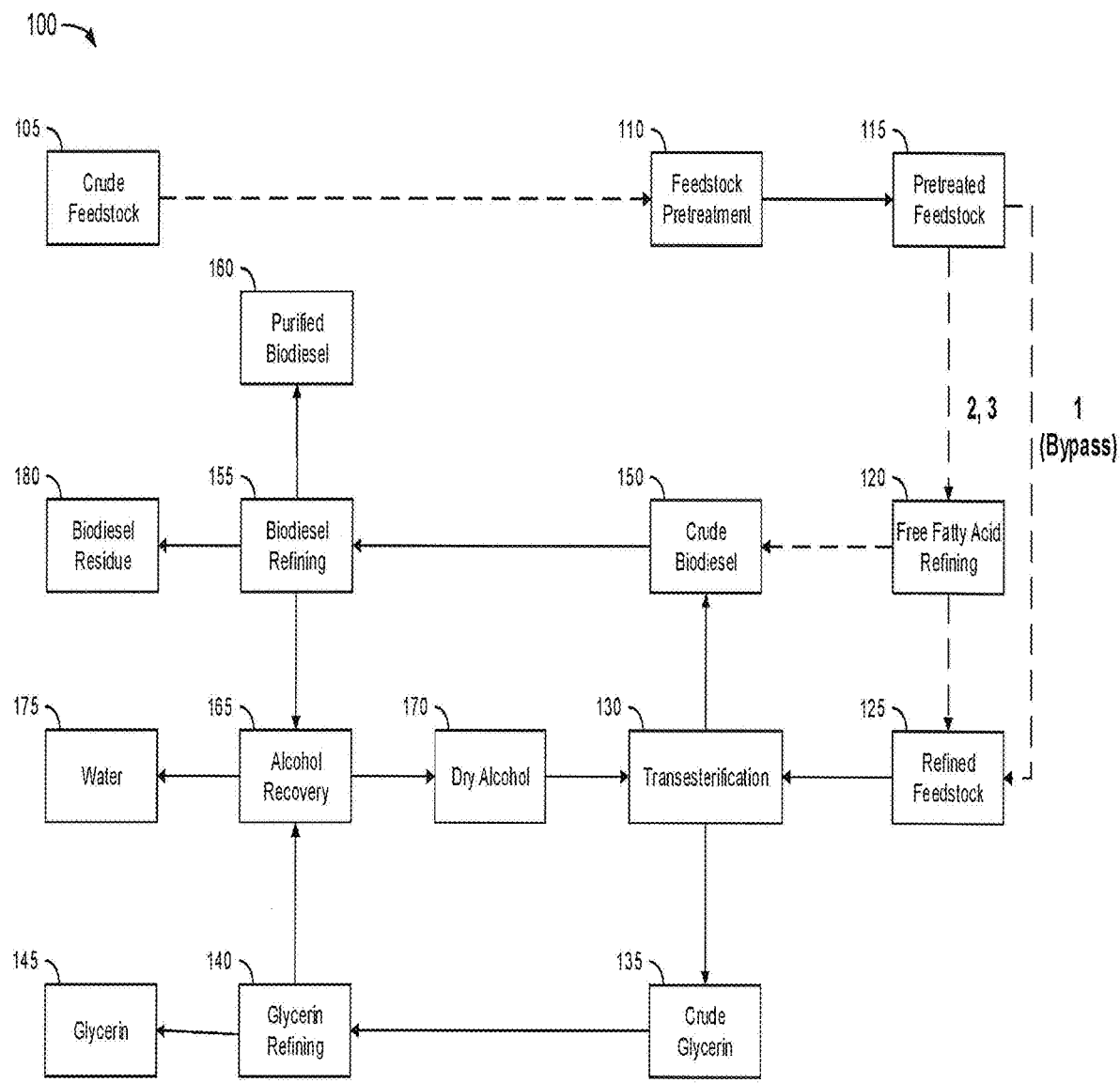
FIG. 1 is a process flow diagram showing several embodiments for biodiesel and valuable chemical production from crude feedstocks.

The apparatus, devices, systems, products, and methods of the present invention will now be described in detail by reference to various non-limiting embodiments, including the figures which are exemplary only.

Unless otherwise indicated, all numbers expressing dimensions, capacities, and so forth used in the specification and claims are to be understood as being modified in all instances by the term "about." If there are uses of the term which are not clear to persons of ordinary skill in the art, given the context in which it is used, "about" will mean up to plus or minus 10% of the particular term.

The present invention may be practiced by implementing process steps in different orders than as specifically set forth herein. All references to a "step" may include multiple steps (or substeps) within the meaning of a step. Likewise, all references to "steps" in plural form may also be construed as a single process step or various combinations of steps.

The present invention may be practiced by implementing process units in different orders than as specifically set forth herein. All references to a "unit" may include multiple units (or subunits) within the meaning of a unit. Likewise, all references to "units" in plural form may also be construed as a single process unit or various combinations of units.

As used in this specification and the appended claims, the singular forms "a," "an," and "the" include plural referents unless the context clearly indicates otherwise.

As used in this specification and the appended claims, the term "fats and oils" refers to any material of biological origin, both vegetable and animal, which is a useful feedstock for making biodiesel. The feedstock may be in a crude form containing impurities and is considered a "crude feedstock" or "crude oil." On the other hand, the feedstock may be pretreated using other equipment to remove impurities. The pretreatment process may occur at a biodiesel production facility or at the source location or both producing a "pretreated feedstock" or "pretreated oil."

The term "refined feedstock" refers to feedstocks having sufficiently low free fatty acid content to be used directly in transesterification. Refined feedstock may include crude alkyl esters.

The term "free fatty acid" refers to aliphatic carboxylic acids having carbon chains with about 6 to about 24 carbon atoms. Free fatty acids (FFA) may be found in fats and oils between 0 to 100 wt % and are susceptible to forming esters upon reacting with an alcohol under esterification conditions.

The term "ester" is used to refer to organic esters wherein a fatty acid moiety is bound to an alcohol moiety by an ester linkage, including mono-esters, di-esters, tri-esters, and more generally multi-esters.

The term "biodiesel" is used to describe a fuel comprised of fatty acid alkyl esters (FAAE) of long chain fatty acids derived from fats and oils. Biodiesel as used herein may also contain a minority of "impurities" or compounds other than FAAE.

The term "biodiesel residue" is used to refer the portion of a crude biodiesel that is removed when the crude biodiesel is converted to a purified biodiesel.

The term "distillation bottoms" is used to refer to the less volatile, or bottoms, product from the distillation of biodiesel wherein biodiesel is the intended distillate, or overhead product. "Distillation bottoms" is the "biodiesel residue" in embodiments where distillation is used to purify the crude biodiesel.

The term "alcohol" is used to refer to an organic alcohol, including monohydric alcohols, dihydric alcohols, and polyhydric alcohols generally.

The term "wax" or "waxy compounds" refers to relatively large molecules with at least one long saturated carbon chain that are found in oils such as corn oil, canola oil, sunflower oil, olive oil, poultry fat, pennycress oil, and some algal or microbial oils. Waxy compounds have a high melting point relative to the whole oil (as high as 80° C.) and can cause the oil to become cloudy when cooled. Waxes have been grouped under the category of unsaponifiable material for the purposes of this discussion. Waxy compounds can cause biodiesel to fail certain tests, even at concentrations less than 0.1 wt %.

The terms "unsaponifiable material" and "unsaponifiables" refer herein to components originally present in a lipid feedstock in minor quantities that are not readily converted to FAAE in a biodiesel production process. With respect to the primary product (biodiesel), unsaponifiable material may be considered impurities that can reduce the FAAE content and/or yield and/or quality of biodiesel. Unsaponifiable material and unsaponifiables include sterols, steryl esters, steryl glucosides, terpenes, tocopherols, vitamins, myricyl esters of fatty acids, sulfolipids, proteins, waxes, flavonoids, carotenoids, hydroxycinnamic acids, and additional components other than FFA and glyceryl esters of fatty acids.

The term "Unsaponifiable Matter" refers herein to the portion of "unsaponifiable material" that can be detected by the test method AOCS Ca 6a-40 "Unsaponifiable Matter in Fats and Oils," which includes sterols, steryl glucosides, terpenes, tocopherols, vitamins, flavonoids, carotenoids, and other components that exhibit low reactivity with strong bases. The AOCS Unsaponifiable Matter test is not capable of quantifying everything herein defined as "unsaponifiable material."

Various chemical reactions and separation techniques can be used to purify unsaponifiable material into valuable chemicals. The term "valuable chemicals" refers to purified unsaponifiable material including sterols, steryl esters, steryl glucosides, terpenes, tocopherols, vitamins, flavonoids, carotenoids, sulfolipids, proteins, hydroxycinnamic acids, fatty acid myricyl esters, waxes, and other components.

The term "gum" or "gums" refers to compounds (e.g., phospholipids) that may be present in a crude feedstock which tend to form insoluble precipitates when contacted with water and emulsions in base-catalyzed transesterification processes. When water is added to the crude feedstock under the appropriate conditions, gums can become hydrated (absorb water) and insoluble so that they can be removed by a centrifugal separator.

The term "Acid Number" refers to a common measurement of the amount of acid functional groups in the molecules in a sample. It specifically refers to the quantity of strong base (typically KOH) required to titrate the acid functional groups in a sample. Acid Number is conventionally expressed as milligrams of potassium hydroxide per gram of sample.

The term "sulfur" refers to the total quantity of sulfur in liquid fuels or feedstocks defined as mg/kg or parts per million (ppm).

The term "cold soak filterability tests" refers to test methods included in commercial specifications such as ASTM D6751-18, CAN/CGSB 3.524 appendix A, and EN 14214 that are used to evaluate the potential cold weather performance of biodiesel and biodiesel blends.

The term "paraffins" as used herein means non-cyclic, branched or unbranched alkanes. An unbranched paraffin is an n-paraffin; a branched paraffin is an iso-paraffin.

The term "aromatics" as used herein is synonymous with "aromates" and means both cyclic aromatic hydrocarbons that do not contain heteroatoms as well as heterocyclic aromatic compounds. The term includes monocyclic, bicyclic and polycyclic ring systems (collectively, such bicyclic and polycyclic ring systems are referred to herein as "polycyclic aromatics" or "polycyclic aromates"). The term also includes aromatic species with alkyl groups and cycloalkyl groups. Thus, aromatics include, but are not limited to, benzene, azulene, heptalene, phenylbenzene, indacene, fluorene, phenanthrene, triphenylene, pyrene, naphthacene, chrysene, anthracene, indene, indane, pentalene, and naphthalene, as well as alkyl and cycloalkyl substituted variants of these compounds. In some embodiments, aromatic species contains 6-14 carbons, and in others from 6 to 12 or even 6-10 carbon atoms in the ring portions of the groups. The phrase includes groups containing fused rings, such as fused aromatic-aliphatic ring systems (e.g., indane, tetrahydronaphthene, and the like).

"Oxygenates" as used herein means carbon-containing compounds containing at least one covalent bond to oxygen. Examples of functional groups encompassed by the term include, but are not limited to, carboxylic acids, carboxylates, acid anhydrides, aldehydes, esters, ethers, ketones, and alcohols, as well as heteroatom esters and anhydrides such as phosphate esters and phosphate anhydrides. Oxygenates may also be oxygen containing variants of aromatics, cycloparaffins, and paraffins as described herein.

"Hydroprocessing" as used herein describes the various types of catalytic reactions that occur in the presence of hydrogen without limitation. Examples of the most common hydroprocessing reactions include, but are not limited to, hydrogenation, hydrodesulfurization (HDS), hydrodenitrogenation (HDN), hydrotreating (HT), hydrocracking (HC), aromatic saturation or hydrodearomatization (HDA), hydrodeoxygenation (HDO), decarboxylation (DCO), hydroisomerization (HI), hydrodewaxing (HDW), hydrodemetallization (HDM), decarbonylation, methanation, and reforming. Depending upon the type of catalyst, reactor configuration, reactor conditions, and feedstock composition, multiple reactions can take place that range from purely thermal (i.e., do not require catalyst) to catalytic. In the case of describing the main function of a particular hydroprocessing unit, for example an HDO reaction system, it is understood that the HDO reaction is merely one of the predominant reactions that are taking place and that other reactions may also take place.

"Hydrotreating" (HT) as used herein involves the removal of elements from groups 3, 5, 6, and/or 7 of the Periodic Table from organic compounds. Hydrotreating may also include hydrodemetallization (HDM) reactions. Hydrotreating thus involves removal of heteroatoms such as oxygen, nitrogen, sulfur, and combinations of any two more thereof through hydroprocessing. For example, hydrodeoxygenation (HDO) is understood to mean removal of oxygen by a catalytic hydroprocessing reaction to produce water as a by-product; similarly, hydrodesulfurization (HDS) and hydrodenitrogenation (HDN) describe the respective removal of the indicated elements through hydroprocessing.

"Hydrocracking" (HC) as used herein means the breaking of a molecule's carbon-carbon bond to form at least two molecules in the presence of hydrogen. Such reactions typically undergo subsequent hydrogenation of the resulting double bond.

"Hydroisomerization" (HI) as used herein is defined as the skeletal rearrangement of carbon-carbon bonds in the presence of hydrogen to form an isomer. Hydrocracking is a competing reaction for most HI catalytic reactions and it is understood that the HC reaction pathway, as a minor reaction, is included in the use of the term HI. Hydrodewaxing (HDW) is a specific form of hydrocracking and hydroisomerization designed to improve the low temperature characteristics of a hydrocarbon fluid.

"Renewable Diesel" is used to describe a hydrocarbon fuel that is chemically similar to petrodiesel, but made from fats and oils.

It will be understood that if a composition is stated to include "$C_x$-$C_y$ hydrocarbons," such as $C_7$-$C_{12}$ n-paraffins, this means the composition includes one or more paraffins with a carbon number falling in the range from x to y.

"Pyrolysis" as used herein is understood to mean thermochemical decomposition of carbonaceous material with little to no diatomic oxygen or diatomic hydrogen present during the thermochemical reaction. The optional use of a catalyst in pyrolysis is typically referred to as catalytic cracking, which is encompassed by the term as pyrolysis, and is not be confused with hydrocracking.

The methods of the invention can accommodate a wide range of feedstocks. In some embodiments of the invention, nonexclusive examples of feedstock are fats and oils including coconut oil, palm oil, palm kernel oil, cottonseed oil, rapeseed oil, peanut oil, olive oil, linseed oil, babassu oil, tea oil, Chinese tallow oil, olive kernel oil, meadowfoam oil, chaulmoorgra oil, coriander oil, canola oil, soybean oil, corn oil, camelina oil, carinata oil, castor oil, pennycress oil, lard oil, jatropha oil, sunflower oil, algae and other microbial oils, used cooking oils, bacon grease, choice white grease, yellow grease, brown grease, poultry fat, beef tallow, lard, and fish oils. Additionally, feedstocks may include purified or distilled fats and oils including fatty acid distillates, such as palm fatty acid distillate, and others. In some cases, distillation bottoms may be considered a crude feedstock for the production of valuable chemicals, including bottoms from crude biodiesel distillation.

Crude feedstocks (105) containing various impurities require pretreatment and/or FFA refining before being subjected to a transesterification process to convert the refined feedstock to crude biodiesel (150) and finally a biodiesel purification process (243) to make high quality purified biodiesel (160) that meets multiple commercial specifications. During this process, valuable chemicals included in unsaponifiable material are subjected to various processing conditions and ultimately separated from the biodiesel residue (180) as co-products to the purified biodiesel (160). An exemplary method (100) with reference to FIG. 1 is outlined for processing crude feedstock (105) into glycerin (145) and purified biodiesel (160) meeting commercial product specifications and biodiesel residue (180).

Crude feedstocks (105) arrive at the biodiesel production facility and are discharged into crude feedstock storage. Compatible feedstocks may be combined and stored in a shared tank before being processed. Crude feedstock (105) first undergoes a feedstock pretreatment process (110) that depends on its FFA content and other properties to produce a pretreated feedstock (115). Alternatively, feedstocks can arrive at the biodiesel production facility already having been refined elsewhere, in which case they can be discharged directly into refined feedstock storage.

The pretreated feedstock (115) may then be subjected to an FFA refining process (120) which removes remaining FFA by way of FFA stripping (dashed line 2). Optionally, FFA refining (120) may yield a stream of crude biodiesel (150) in the case of FFA stripping followed by esterification of the fatty acid distillate. As another option, FFA refining (120) may yield a stream of glycerides (125) in the case of FFA stripping followed by glycerolysis of the fatty acid distillate. In one embodiment, as shown by dashed line 1, pretreated feedstock (115) having sufficiently low levels of FFA to be categorized as refined feedstock (i.e., the crude feedstock was chemically refined to remove FFA in feedstock pretreatment (110) or was refined elsewhere) can bypass the FFA refining unit (120).

Refined feedstock (125) is processed in a transesterification process (130) to yield crude biodiesel (150) and crude glycerin (135). Crude glycerin (135) may be refined in a glycerin refining unit (140) yielding glycerin (145) which may be recycled into the FFA refining process (120) for glycerolysis. Crude biodiesel (150) undergoes a final biodiesel refining process (155) to produce a commercially-acceptable purified biodiesel product (160) and a biodiesel residue (180) enriched in unsaponifiable material. Wet alcohol from biodiesel refining (155) and glycerin refining (140) is sent to an alcohol recovery unit (165) to separate water (175) and recover dry alcohol (170). Embodiments of the unit operations of FIG. 1 are described in more detail in FIG. 2.

Figure 2:
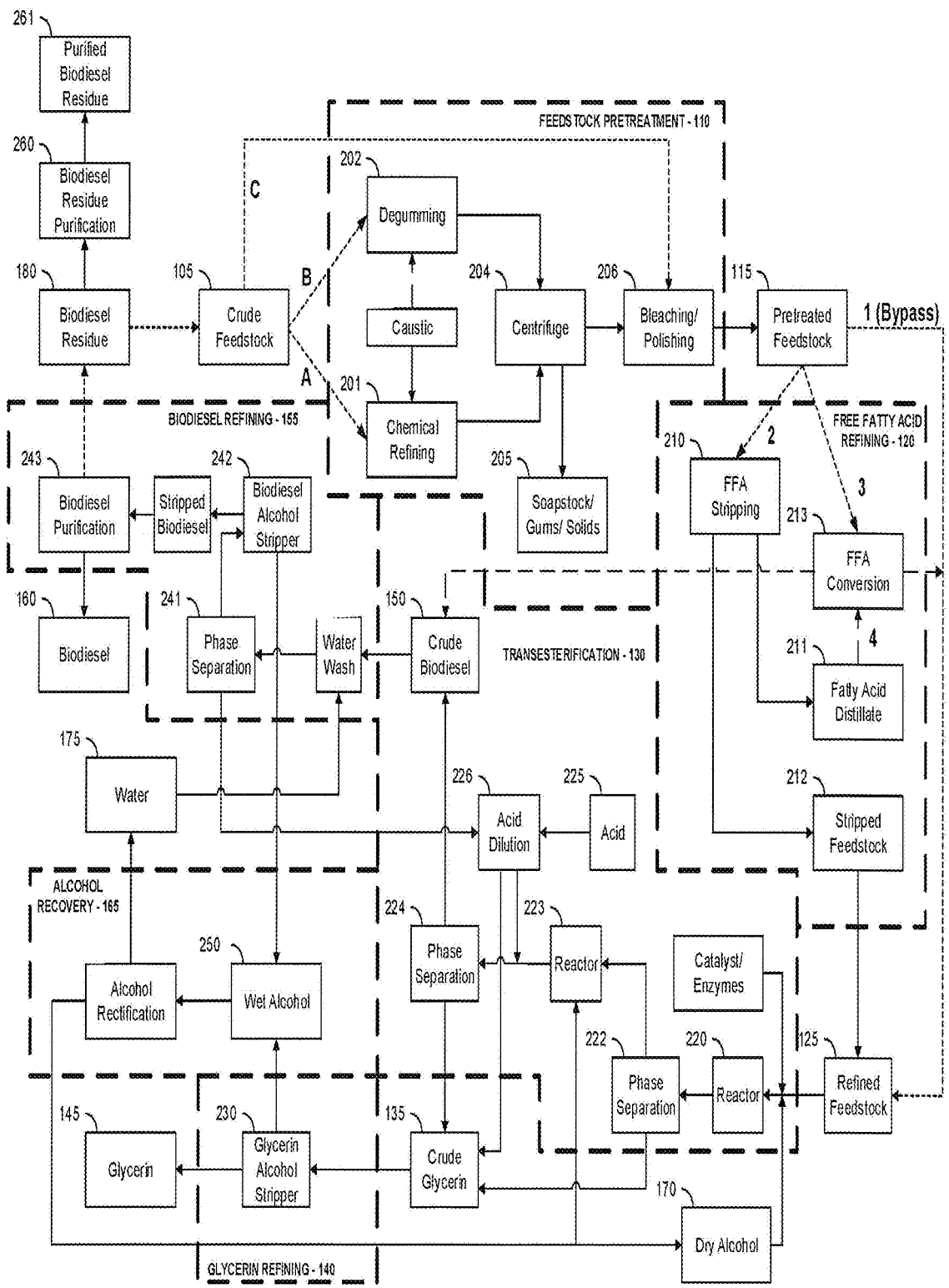
FIG. 2 is a process flow diagram showing more specific embodiments for biodiesel and valuable chemical production from crude feedstocks shown in FIG. 1.

FIG. 2 shows process embodiments similar to the embodiments shown in FIG. 1, except FIG. 2 shows additional embodiments and process steps in more detail. Crude feedstock (105) is received into storage at the biodiesel production facility. Compatible feedstocks may be combined and stored in a shared tank before they are processed further. Crude feedstocks (105) are pretreated and refined as dictated by their FFA content and other feedstock properties. Crude feedstock (105) may undergo either a chemical refining (201) (dashed line A), degumming (202) (dashed line B), or a bleaching and polishing (206) (dashed line C) pretreatment step depending on its physical and chemical characteristics. In both embodiments described above, feedstock leaving the chemical refining unit (201) or the degumming unit (202) is processed in a centrifugal separator (204). The centrifugal separator unit (204) removes the aqueous phase and any hydratable or polar compounds from the crude feedstock formed in unit (201) or (202) in addition to any solids. This aqueous phase may be referred to as soapstock (205) in both embodiments.

Once the crude feedstock (105) has passed through the centrifugal separator (204) it may undergo one or more drying, bleaching and polishing steps in unit (206) including heat bleaching or clay bleaching steps to reduce color, solids, residual soaps, moisture and other impurities in the partially refined feedstock. In one embodiment the feedstock is bleached and dried in the same unit operation. In another embodiment the feedstock is dried by a vacuum-dryer, flash drum, or other such means to a desired water content either before and/or after it enters the bleaching unit. The desired water content depends on the type of filter material that is used in the bleaching unit and the impurities that are present in the feedstock at this point.

After the feedstock has been dried and bleached it enters a polishing filter where any remaining filterable impurities are removed, along with any fine particles of filter material from the bleaching step. For feedstocks containing waxy compounds, the preceding steps may remove a small quantity of wax if operated at low temperatures (<140° F., for example). However, since wax is somewhat soluble in oil even at relatively low temperatures, a substantial portion of the waxes are retained in the feedstock and are carried through to the biodiesel. Also, the viscosity of oils and fats increases dramatically with decreasing temperature, which means lower refining temperatures can dramatically reduce the feasible throughput of any filtration process unit that operates at a lower temperature.

At this point, at least some of the unsaponifiable material in the crude feedstock (105) remains in the pretreated feedstock (115).

Depending on the effectiveness of the initial crude feedstock pretreatment strategy process and the pretreated feedstock FFA content, the pretreated feedstock (115) may optionally undergo further processing. If free fatty acids have been removed in the chemical refining unit (201) and centrifuge (204) in the form of soapstock (205), the pretreated feedstock (115) may continue directly to the transesterification process as a refined feedstock (125) as shown by dashed line 1. However, if a significant quantity of free fatty acids remain (>0.2 wt %, for example) because the crude feedstock (105) was pretreated with a degumming process (202) (dashed line B) and/or a bleaching and polishing step (206) (dashed line C), the pretreated feedstock (115) requires further processing in either the PEA stripping unit (210) or in the FFA conversion unit (213). Free fatty acids in the crude feedstock (105) are generally undesirable in the transesterification process (130) because they form soaps in the oil when they react with the base catalyst used to drive the transesterification reaction. Therefore, they must be either removed or converted or both. There are two primary processing options to reduce FFA levels in the pretreated feedstock (115): 1) stripping (or deacidification) to physically remove FFAs from the feedstock (210) and 2) chemical conversion by one of either esterification or glycerolysis (213). Glycerolysis is a subcategory of esterification in which glycerol, an alcohol, is used to convert FFAs into glycerides, which are fatty acid esters of glycerol, An advantage of this invention over prior art is that a feedstock with any FFA content (0-100 wt %) can be processed with the appropriate feedstock pretreatment embodiment (110).

In one embodiment shown by dashed line 2, the pretreated feedstock (115) is stripped of free fatty acids along with other components of low molecular weight relative to triglycerides, including tocopherols and sterols, in a physical FFA refining step using distillation (210). Although the FFA stripping step can be performed on feedstocks having any FFA level, a preferred FFA level is between about 0.5 wt % FFA and about 30 wt % FFA. The FFA stripping step (210) may employ steam, hot oil, or other thermal fluid to heat the crude feedstock. The distillation may occur under vacuum to remove free fatty acids from the oil phase by evaporation in unit (210). The FFA stripping step (210) may employ a distillation column, wiped-film evaporator, or other such equipment and it may optionally include the injection of steam into the distillation unit to facilitate the separation of the FFAs from the remainder of the feedstock. Two product streams can be produced from FFA stripping (210): a relatively pure fatty acid distillate (211) made up of greater than about 50 wt % FFA s well as small amounts of tocopherols and sterols and the stripped feedstock (212) containing less than about 0.5 wt FFA and small amounts of steryl esters. The stripped feedstock stream (212) is sufficiently purified during FFA stripping (210) that it can enter the transesterification process as a refined feedstock (125). The fatty acid distillate stream (211) may be sold as a final product or may undergo further processing to chemically convert the FFAs in unit (213) (dashed line 4).

In another embodiment, pretreated feedstock (115) including small amounts of unsaponiliable material is directly processed in unit (213). Feedstocks having between 0.1-100 wt % FFA can be processed in the FFA conversion unit (213) to convert FFA into esters by way of esterification or glycerides by way of glycerolysis (dashed line 3). Fatty acid distillate (211) from FFA stripping (210) may also be processed in the FFA conversion unit (213) (dashed, line 4).

In one embodiment pretreated feedstock (115) (following dashed arrow 3) and/or fatty acid distillate (211) (following dashed arrow 4) is esterified to form alkyl esters in unit (213). In this embodiment free fatty acids may be esterified using a homogeneous and/or heterogeneous catalyst with an alcohol (e.g. dry alcohol from unit 170) to form fatty acid alkyl esters. When pretreated feedstock (115) or fatty acid distillate (211) is processed by esterification in FFA conversion unit (213), the unsaponifiables also may react to some degree. For instance, the sterols may form steryl esters with the free fatty acids. Therefore, the product, whether refined feedstock (125) in the case of pretreated feedstock (115) esterification or crude biodiesel (150) in the case of fatty acid distillate (211) esterification will likely contain a combination of tocopherols, sterols, terpenes, and steryl esters.

In another embodiment, pretreated feedstock (115) (following dashed arrow 3) and/or fatty acid distillate (211) (following clashed arrow 4) undergo glycerolysis to form glycerides in unit (213). In this embodiment, free fatty acids from the pretreated feedstock (115) or fatty acid distillate (211) may be reacted with glycerin from unit (145) in FFA conversion unit (213) to form mono-, di-, and triglycerides, which can then be transesterified to produce biodiesel. Various process equipment may be used within the FFA conversion unit (213) to reduce the FFA of the glycerolysis output stream to less than about 5 wt %, 4 wt %, 3 wt %, 2 wt %, 1 wt %, 0.5 wt %, 0.3 wt % or 0.1 wt % FFA before entering transesterification as a refined feedstock (125).

Similarly, the unsaponifiable material in the crude or pretreated feedstock (115) or fatty acid distillate (211) may react under glycerolysis conditions. In particular, free sterols may form steryl esters with the free fatty acids present in the crude or pretreated feedstock. Recently, steryl esters have received increasing attention as a valuable chemical of interest to nutraceutical industries.

Thus, feedstock (105) containing any quantity of FFA can be processed by at least one of the pretreatment (110) and FFA refining (120) methods described above whereby FFAs are removed in a chemical refining unit (201), a physical refining unit (210) and/or converted by esterification or glycerolysis in a FFA conversion unit (213). However, in each pretreatment (110) and FFA refining (120) approach a small amount of free fatty acids typically remains and ends up in the finished biodiesel product, which increases the biodiesel Acid Number.

Once the feedstock has been pretreated (110) and refined (120) it enters the transesterification process (130) and then on to the biodiesel refining process (155). There are several processes that may be used to produce biodiesel from oils and fats, including base-catalyzed transesterification, acid-catalyzed transesterification and enzymatic transesterification.

In one embodiment, biodiesel is produced from feedstock using base-catalyzed transesterification in one, two, three, or more reactors. In one embodiment, refined feedstock (125) is subjected to a transesterification reaction process and then refined to produce purified biodiesel (160) and glycerin (145). The transesterification reaction mixture leaves the reactor (220) and enters a phase separation unit (222). In the phase separation unit (222) the reaction mixture is separated into two-phases: an ester-rich phase (crude biodiesel) that is transferred to an additional reactor or reactors (223) and a glycerin-rich phase (crude glycerin) collected in unit (135). The crude glycerin (135) is more dense than the crude biodiesel (150) and the two phases can be separated by gravity separation in a decanting vessel or, if needed or desired, by centrifugal separation. The unsaponifiable material tends to remain in the crude biodiesel (150) during the separation process.

Once the transesteritication reaction is complete in the second reactor (223), the reaction mixture enters a second phase separation unit (224). In one embodiment, acid (225) is mixed with the reaction mixture leaving reactor (223) to deactivate the transesterification catalyst before entering the phase separation unit (224). In other embodiments the catalyst is deactivated after the phase separation unit. The acid can be diluted with water (175) prior to being introduced to the reaction mixture in an acid dilution vessel (226). In the phase separation unit (224) the reaction mixture is again separated into two-phases: an ester-rich phase or crude biodiesel (150) and a glycerin-rich phase or crude glycerin (135) sent to unit (230). Each of these crude phases may include a significant amount of the excess alcohol used in the reaction. Moreover, the crude reaction products may include other impurities such as excess catalyst, soaps, salts, water, and high boiling impurities. In one embodiment, some or all of these impurities may be treated or removed from the crude reaction products before the biodiesel and the glycerin phases are separated in unit (224). The unsaponifiable material however, tends to remain with the crude biodiesel (150) even after the other impurities have been treated or removed with the crude glycerin (135).

Crude biodiesel (150) leaving the phase separation unit (224) will still include impurities and unsaponifiable material and therefore must be purified in one or more unit operations. The order and number of these operations may vary depending on crude feedstock properties, pretreatment process, transesterification process, and economic feasibility. After the crude biodiesel (150) is separated from crude glycerin (135) in unit (224), it is typically subjected to further biodiesel refining (155). For example, after separation, the crude biodiesel may contain residual alcohol, glycerin, small amounts of catalyst, salts, and soaps. This may be the case even if the crude reaction products are refined to remove or neutralize impurities prior to separation.

Depending on the feedstock, its impurities, and unsaponifiable material, the biodiesel purification unit (243) may differ. In one embodiment, the crude biodiesel (150) is subjected to a cold filtration process in unit (243) such that high melting components, such as proteins, waxes, and certain unsaponifiable material, are cooled to below their solubility point and removed by filtration. Cold filtration techniques may use diatomaceous earth (DE) or other filter media to increase the effectiveness of the filtration. In this way, the crude biodiesel (150) can be made to meet commercial cold soak filterability tests. In a cold filtration process, the unsaponifiable material captured in the filter cake can be recovered using a variety of separation and extraction processes to produce valuable chemicals. Generally, combining the cold filtration option with feedstock pretreatment (110) and FFA refining (120) has many advantages. However, certain feedstocks may cause the filter(s) to plug more quickly and require more frequent down time for filter changes and higher operating costs, and filtration may not be capable of removing sufficient quantities of these components under reasonable operating conditions at desirable production rates. Such feedstocks include those with unsaponifiable material content, such as corn oil, sunflower oil, olive oil, pennycress oil, certain poultry fats, and some algal or microbial oils. Because of their solubility in FAAE across a wide temperature range, waxes and certain other unsaponifiable material cannot always be fully eliminated from the finished biodiesel in a cost-effective manner using a combination of a pretreatment process (110), FFA refining process (120), and a cold filtration process or similar winterization technique.

In another embodiment, the crude biodiesel (150) is subjected to a membrane filtration process in unit (243) such that high melting components, such as proteins, waxes, and certain unsaponifiable material, are condensed and removed below their melting point. Membrane filtration may occur at cold temperatures such that condensed materials are more easily filtered or at higher temperatures using membranes with very small pores that can separate larger or more polar molecules from a solution (e.g., nanofiltration). In this way, the crude biodiesel (150) can be made to meet certain commercial biodiesel specifications. Membrane filtration techniques may include ceramic membranes, polymer membranes, molecular sieves, and carbon fibers or nanotubes. In one embodiment, product leaving the phase separation unit (241) may directly enter a membrane filtration unit which removes both methanol and water rather than passing through a biodiesel alcohol stripper (242). Using this approach, unsaponifiable material may be recovered from the membranes using various solvent extraction techniques to yield valuable chemicals.

In another embodiment, the crude biodiesel (150) is subjected to a resin filtration process in unit (243) such that impurities, including residual water, are removed. In this way, the crude biodiesel (150) can be made to meet certain commercial biodiesel specifications. Resin filtration techniques may include dry wash resins, ion-exchange resins, and other absorbent or adsorbent resins. In one embodiment, product leaving the phase separation unit (224) or (241) may directly enter a resin filtration unit which may remove methanol, glycerin, water and other impurities rather than passing through additional purification units. Once again, some unsaponifiable material may be recovered from the resin filters using various solvents to yield valuable chemicals. These same solvents may help to regenerate or reactivate the resins.

In another embodiment, crude biodiesel (150) can be subjected to purification by distillation in unit (243) to remove or reduce the levels of unsaponifiable material, soaps, phospholipids, proteins, color compounds, sulfur compounds, high-boiling compounds with acid or base functional groups, and mono-, di-, and triglycerides in the form of distillation bottoms (180). The resulting distilled biodiesel (160) is purified and should be commercially acceptable in spite of the problematic components that were present in the initial crude feedstock. Such a distillation process can be performed by various process equipment, including flash vessels, distillation vessels, distillation columns, short path distillation, wiped film evaporators, thin film evaporators, falling film evaporators, and other thermal separation strategies.

The unsaponifiable material that is recovered in the biodiesel residue (180) is generally less than about 10 wt %, 8 wt %, 6 wt %, 4 wt %, 2 wt % and 1 wt % of the crude biodiesel (150) entering the biodiesel purification unit (243). However, due to the large capacities of a biodiesel plant, this may amount to significant quantities. As such, the unsaponifiable material in the biodiesel residue (180) can be a source of components such as sterols, steryl esters, steryl glucosides, terpenes, tocopherols, vitamins, sulfolipids, proteins, hydroxycinnamic acids, fatty acid myricyl esters, waxes, flavonoids, carotenoids, and other valuable chemicals.

In one embodiment, purification in the biodiesel purification unit (243) will yield a biodiesel residue (180) product that, with additional purification (260), is a concentrated and economical source of valuable chemicals (261). Various methods for purifying and obtaining valuable chemicals (261) from biodiesel residue (180) in unit (260) include: saponification, transesterification, esterification, hydrolysis, precipitation, sedimentation, crystallization, distillation, and solvent separation techniques.

In one embodiment, biodiesel purification in unit (243) is by distillation to purify the crude biodiesel to reduce protein and unsaponifiable material content such that the purified biodiesel product will pass cold soak filterability tests. In one embodiment biodiesel distillation in unit (243) purifies the crude biodiesel to remove unsaponifiable material and other compounds causing a second inflection point and elevated Acid Number when titrated according to ASTM D664-17 Method B, such as hydroxycinnamic acids. In one embodiment biodiesel distillation in unit (243) purifies the crude biodiesel to remove unsaponifiable material such that the purified biodiesel product will have increased FAAE content and/or improved filterability. In one embodiment biodiesel distillation in unit (243) purifies the crude biodiesel to reduce color compounds such that the purified biodiesel product will have a lighter color than the original feedstock. In one embodiment biodiesel distillation in unit (243) purifies the crude biodiesel to reduce color compounds such that the purified biodiesel product will meet color requirements for customer acceptance and/or will not appear similar to diesel dyed for off-road use. In one embodiment biodiesel distillation in unit (243) purifies the crude biodiesel to remove glycerides such that the purified biodiesel product will meet commercial monoglyceride specifications such as the new monoglyceride specification in ASTM D6751-18 and future glyceride specifications should they be introduced. In one embodiment biodiesel distillation in unit (243) purifies the crude biodiesel to remove a portion of sulfur-containing species such that the purified biodiesel product will meet commercial sulfur limits in ASTM D6751-18 and future sulfur specifications should the current limits be tightened.

In one embodiment, biodiesel distillation occurs between 170-300° C. and 800-0 Torr. In another embodiment; biodiesel distillation occurs between 200-300° C. and 800-0 Torr. In another embodiment, biodiesel distillation occurs between 230-290° C. and 40-0 Torr. In yet another, biodiesel distillation occurs between 240-280° C. and 5-0.01 Torr.

In one embodiment, the biodiesel product (160) produced from the biodiesel purification process (243) will have a wax content of less than about 0.1 wt %, an Unsaponifiable Matter content of about 2 wt % or less, a soap content of about 50 ppm or less, a sulfur content of about 500 ppm or less, a monoglyceride content less than about 0.6 wt %, a cold soak filtration result of about 360 seconds or less and a lighter color than the original feedstock.

In another embodiment, the biodiesel product (160) produced from the biodiesel purification process (243) will have a wax content of less than about 0.05 wt %, an Unsaponifiable Matter content of about 1 wt % or less, a soap content of about 20 ppm or less, a sulfur content of about 15 ppm or less, a monoglyceride content less than about 0.5 wt %, a cold soak filtration result of 240 seconds or less and a lighter color than the original feedstock.

In one embodiment, the biodiesel product (160) produced from the biodiesel purification process (243) will have a wax content of less than about 0.01 wt %, an Unsaponifiable Matter content of about 0.5 wt % or less, a soap content of about 10 ppm or less, a sulfur content of about 10 ppm or less, a monoglyceride content less than about 0.4 wt %, a cold soak filtration result of about 200 seconds or less and a lighter color than the original feedstock.

Traditional feedstock pretreatment techniques remove very little unsaponifiable material. In one embodiment, a portion of the unsaponifiable material is removed in the FFA stripper in a product called fatty acid distillate. Fatty acid distillate primarily contains FFA but also tocopherols, sterols, mono- and di-glycerides, and other unsaponifiable material. Some compounds, such as steryl esters, for example, have a sufficiently high boiling point to be predominantly retained in the glycerides and continue on with the stripped feedstock and end up in the crude biodiesel.

There are a number of options for processing fatty acid distillate. In one embodiment glycerin is added to the fatty acid distillate in a glycerolysis reaction. During the reaction the FFA is formed into mono-, di- and tri-glycerides while a portion of the sterols react with the FFA to form steryl esters. Once the FFA in the glycerolysis reaction is sufficiently consumed and the water is removed, the product emerges as a feedstock containing glycerides, tocopherols, steryl esters, and residual water.

In one embodiment the crude biodiesel is dried in an alcohol stripper (242) to remove the water and alcohol as wet alcohol. The dried biodiesel can then be purified in unit (243) using a number of techniques where the unsaponifiables can be recovered. In one embodiment, the dried biodiesel is purified in unit (243) using distillation to separate the unsaponifiable material and impurities by concentrating them in the distillation bottoms (180). The distillation bottoms (180) then contain a significant amount of unsaponifiable material from which valuable chemicals such as tocopherols, sterols, steryl esters, terpenes, sulfolipids, proteins, hydroxycinnamic acids, fatty acid myricyl esters, waxes, flavonoids, carotenoids, and other valuable chemicals can be recovered.

The valuable chemicals of interest can be recovered from the biodiesel residue (180) by exploiting unexpected differences in solubility in various solvents. In one embodiment, the biodiesel residue (180) can first be treated with a very low polarity, low molecular weight solvent, such as hexane or heptane, to remove waxes, terpenes, and other components of interest by sedimentation. The recovered liquid phase can then be treated with a more polar, denser solvent, such as an alcohol, to recover a biodiesel blendstock in the heavy (alcohol) phase. The sterols and steryl esters from the biodiesel residue (180) are now enriched in the original solvent and can be recovered by evaporating the solvent to leave a sediment solid or gel.

In another embodiment, the biodiesel residue (180) can first be treated with a moderately polar solvent, such as acetone or ethyl acetate, to produce a sediment enriched in waxes, terpenes, and other components and a supernatant liquid. The sediment may be treated at least a second time with a mildly polar solvent to recover additional components of interest into a supernatant liquid phase. All such liquid phases are then combined to yield a solvent stream enriched in biodiesel, glycerides, sterols, and steryl esters. The solvent stream can then be treated with water to produce a water layer and a sediment enriched in sterols and steryl esters. Above this water layer is an organic phase enriched in biodiesel and glycerides which can be recycled, after removing residual solvent, as either a biodiesel blendstock or a biofuel feedstock, depending on its composition.

With at least a portion of the unsaponifiable material removed from the biodiesel residue (180), the remainder of the biodiesel residue (180) may then also have increased value as either a biodiesel blendstock or a biofuel feedstock. In some embodiments, the remainder of the biodiesel residue (180) may be recycled as a portion of the feedstock for a biofuel production process. In other embodiment, at least a portion of the remainder of the biodiesel residue (180) may be blended with the finished biodiesel because the removal of the unsaponifiable material improves its quality as a biodiesel blendstock.

Another aspect of the invention relates to the conversion of biodiesel residue (180) (or other biological feedstock (301) having a high unsaponifiable material content) into diesel-range hydrocarbons via hydrodeoxygenation. It has surprisingly been observed that biodiesel residue (180) such as distillation bottoms and other biological feedstocks containing relatively high concentrations of unsaponifiable materials, at least 2%, and preferably at least 4% unsaponifiable materials, and comprising at least 20% heavies (herein defined as the mass fraction with boiling point greater than about 400° C. according a test method such as ASTM D2887-18 or ASTM D7169-11) can be converted into diesel-range hydrocarbons. In some embodiments, the high unsaponifiable-content biological feed comprises crude tall oil.

Figure 3:
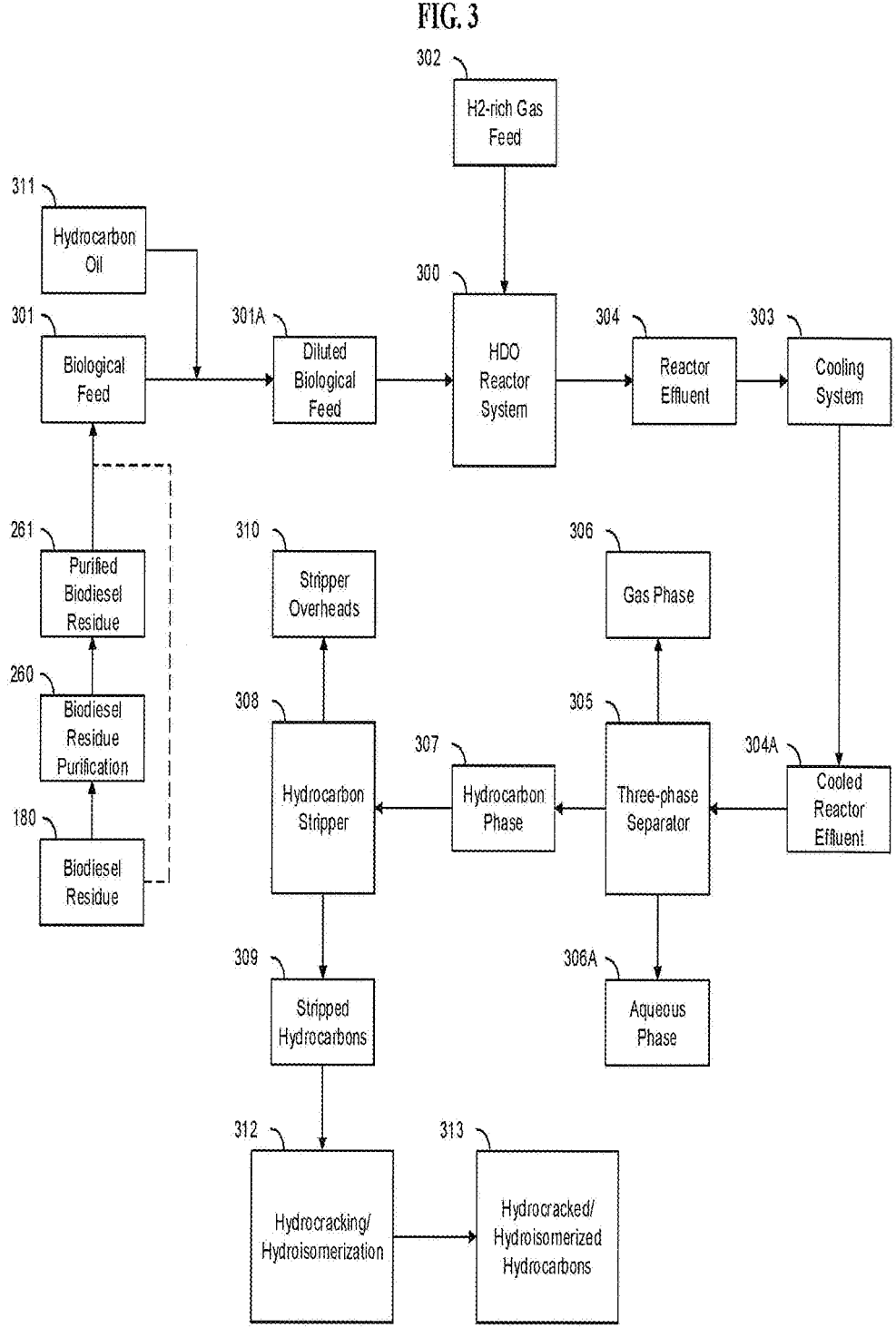
FIG. 3 is a process flow diagram showing embodiments which include a hydrodeoxygenation reactor system.

For describing the invention, a preferred embodiment is presented in FIG. 3. Referring to FIG. 3, a biological feedstock (301) comprising free fatty acids, fatty acid esters (including mono-, di-, and triglycerides), and unsaponifiable materials at concentrations greater than or equal to 2%, preferably greater than 4%, are combined with a hydrocarbon oil diluent (311) to provide a diluted biological feed (301A). In some embodiments the biological feedstock (301) comprises biodiesel residue (180) such as distillation bottoms. The diluent-to-feed ratio (i.e. volumetric ratio of stream from 311 to stream from 301) is between 1-to-1 and 20-to-1, preferably between 2-to-1 and 4-to-1. In some embodiments, the biological feedstock (301) comprises unsaponifiable materials such as sterols and steryl esters (reaction product of sterols and carboxylic acids). For quantifying the percent unsaponifiables in steryl esters, it is assumed that 60% of the mass of the steryl ester is an unsaponifiable sterol. (This is based on the sterol being campesterol, C28, and the carboxylic acid being oleic acid, C18.) The biological feed may additionally contain 0 to 1% free glycerin. The saponifiable components comprise free fatty acids and fatty acid esters, including fatty acid methyl/ethyl esters and glycerides (i.e., mono-, di-, and triglycerides). In terms of total oxygen heteroatoms, the biological feedstock (301) preferably contains between 8 and 14 wt % elemental oxygen.

The hydrocarbon oil diluent (311) is mainly hydrocarbons. In some embodiments the hydrocarbon oil diluent (311) is greater than 99% hydrocarbons. These comprise hydrocarbons from petroleum, coal, natural gas, bitumen (tar sands), or biological sources. The hydrocarbon oil may include up to 0.1 wt % oxygen, nitrogen, and sulfur each, including from additives (e.g. corrosion inhibitors, antioxidants, etc.). In some embodiments, the hydrocarbon oil is at least 90% saturates. In some embodiments, the hydrocarbon oil has no more than 5% aromatic hydrocarbons, preferably no more than 1%. In some embodiments, the hydrocarbon diluent has no more than 10% olefins, preferably no more than 2%. The hydrocarbon oil is preferably in the middle distillate range with initial boiling point greater than 177° C. and a 90% distillation temperature less than 330° C., comprising C15-C18 paraffins.

Referring again to FIG. 3, steams from 301 and 311 are transferred to a hydrodeoxygenation reactor (HDO) reactor system (300). The diluted biological feedstock (301A) and a hydrogen ($H_2$)-rich gas feed (302), also at or above reactor system pressure, are introduced to the HDO reactor system (300). In some embodiments the Hz-rich gas (302) has a hydrogen concentration between 70 and 100 mol %. There the feeds are combined and heated to a reactor inlet temperature. In some embodiments, the HDO reactor system includes provisions for heating feeds (302) and (301A) together or separately. In some embodiments, the biological feed (301) is not directly heated, but instead through contacting with pre-heated feeds (311) and/or (302). In some embodiments, the diluted biological feed (301A) and the Hz-rich gas (302) come to contact with a hydrodeoxygenation catalyst at a temperature between 500° F. (260° C.) and 700° F. (371° C.) at a reactor pressure of 500-2500 psig. The HDO reactor is a fixed-bed reactor packed with hydrotreating catalysts. Hydrotreating catalysts are generally alumina extrudates impregnated with Ni (1-20%), Mo (2-40%), Co (1-20%), or W (2-40%). These catalyst have the desired HDO activity/selectivity in the sulfide form (i.e. as $Ni_3S_2$; $MoS_2$; $WS_2$; $Co_9S_8$). To ensure the catalyst stays in the desired sulfide state, a sulfur compound such as dimethyl disulfide is added to the feed, typically in the 100-1000 wppm range (sulfur in biological feed). Fixed-bed HDO reactors typically operate adiabatically wherein the heat of reactions is not directly removed from the reactor. In such operating embodiments, the temperature rise across the reactor due to heat of reaction is controlled by introduction of unheated Hz-rich gas (Stream 302), or unheated liquid feed (Stream 301, 311, or 301A) to the reactor as quench.

In some embodiments, the HDO reactor is a slurry reactor (e.g. a slurry bubble column reactor). Slurry reactors typically use powder-type catalysts in the 40-100 micron range instead of extrudates; however the catalytic composition is similar to extrudates in terms of base metal content.

Referring again to FIG. 3, a reactor effluent (304) comprising reaction products and byproducts is cooled in a cooling system (303). The reaction products comprise an oxygen-diminished biological product and a vapor phase comprising reaction byproducts, water and carbon oxides ($CO/CO_2$). In some embodiments the reactor effluent (304) has a temperature in the 550° F. (288° C.) to 800° F. (427° C.) range. The cooling system (303) cools the reactor effluent (304) to a temperature between 200° F. (93° C.) and 350° F. (177° C.) such that oxygen-diminished product is cooled and the condensable vapor phase byproducts are condensed. A cooled reactor effluent (304A), comprising a liquid phase and gas phase, is transferred to a three-phase separator 305 wherein it is separated into a gas phase (306), a hydrocarbon phase (307), and an aqueous phase (306A). The three-phase-separator (305) operates at the HDO reactor system pressure, minus line flow pressure drop. In some embodiments the cooling/condensation and separation is achieved in a plurality of steps comprising a "hot separator" and a "cold separator."

The gas phase (306) comprises the unreacted $H_2$, along with reaction coproducts/byproducts propane, CO, $CO_2$, and $H_2S$. Since most biological feedstock contain nitrogen compounds, gas phase (306) typically includes $NH_3$ as well. In some embodiments, the gas phase (306) is combined with Hz-rich gas (302) and recycled to HDO reactor system (241). In some embodiments, the gas phase (306) is purified, e.g. by scrubbing (i.e., gas absorption) via caustic or amine solutions, to remove at least a portion of $CO_2$, $H_2S$, and $NH_3$.

The aqueous phase (306A) comprises water produced during hydrodeoxygenation of oxygen heteroatoms in the biological feed. Despite containing dissolved sulfide, carbonate, and ammonium species, the pH of aqueous phase (306A) is generally close to neutral (6.5-7.5)

The hydrocarbon phase (307) is the oxygen-diminished product of the hydrodeoxygenation of biological feed (301), comprising less than 0.1 wt % oxygen. Additionally, the oxygen-diminished product comprises at least 90% saturated hydrocarbons (paraffins, isoparaffins, and cycloparaffins combined), less than 5% olefinic hydrocarbons, less than 1% aromatic hydrocarbons, and comprising C15-C18 paraffins. The hydrocarbon phase (307) may be stripped of dissolved $H_2S$, $H_2O$, and $NH_3$ in a stripper (308). The stripper (308) operates at a lower pressure than the three-phase separator (305), typically in the range of 0 to 150 psig. In some embodiments, a stripping gas like steam or nitrogen is employed to achieve better removal of the dissolved sour gases and water. A stripper overhead vapor stream (310) comprising $H_2S$, $H_2O$, $NH_3$, is thus removed from stripped hydrocarbon product (309).

In some embodiments the stripped hydrocarbon product (309) is a hydrocarbon comprising less than 0.1 wt % oxygen, less than 10 ppm sulfur, less than 10 ppm nitrogen, and less than 200 ppm water; preferably less than 100 ppm. The hydrocarbon has an initial boiling point greater than 177° C. and a 90% distillation temperature less than 338° C. (as measured by standard test method ASTM D86 or equivalent), and comprises C15-C18 paraffins.

In some embodiments, the hydrocarbon diluent (311) comprises the hydrocarbon phase (307). In some embodiments, the hydrocarbon diluent (311) comprises the stripped hydrocarbon product (309). In some embodiments, the stripped hydrocarbon product (309) is used as a diesel filet additive. In some embodiments, the stripped hydrocarbon product (309) is subjected to hydrocracking and/or hydroisomerization (312) according to prior art methods to improve the low-temperature properties (e.g., cloud point) of the hydrocarbon product (309) for use as diesel fuel. In some embodiments, the hydrocracked and/or hydroisomerized hydrocarbon (313) is fractionated into renewable diesel/jet fuel, and naphtha fractions.

In a related aspect, the biodiesel residue (180) such as distillation bottoms may be recovered from at least one of transesterification or esterification of unconventional lipids. In one embodiment, the biodiesel residue (180) may be recovered using the processes described above. Unconventional lipids are herein defined as those characterized by a fatty acid profile including at least 20 wt % fatty acids of 20 carbon chain length or longer (i.e., 20% C20+ fatty acid content). Examples of such lipids include carinata oil with 55-57% C20+ fatty acids, high erucic acid rapeseed oil with 52-60% C20+ fatty acids, and *Lesquerella Fendleri* (a flowering plant in the mustard family) with 65-68% C20+ fatty acids. These unconventional lipids are generally not suitable for human consumption, grow on land that is generally not suitable for farming, and have a higher energy content (heat of combustion) than conventional vegetable oils and animal fats. As such, plants that produce these oil seeds are often referred to as "energy crops." In principle, such unconventional lipids should be attractive for biofuel production. However, the biodiesel produced from such lipids typically has a 90% distillation recovery temperature (i.e., T90 per ASTM D1160-15) greater than 360° C. and therefore not conforming to the ASTM D6751-18 biodiesel specification, which limits the T90 to 360° C. max.

In some embodiments, a feedstock comprising unconventional lipids is subjected to transesterification with methanol to yield fatty acid methyl esters (FAME) with a range of fatty acid chain lengths. Even when blended with conventional C16/C18 fatty acid lipids, the C20+ fatty acids in the lipid blend subjected to transesterification is at least 10 wt %. Transesterification methods and systems are described in the prior art and earlier in this specification. Persons skilled in the art recognize that although methanol is described as the light alcohol for transesterification with the unconventional lipid, other light alcohols such as ethanol and C3/C4 alcohols (e.g. isobutanol) can be used to produce fatty acid alkyl esters. The effluent from the transesterification reactor comprises light esters (e.g., FAAE with fatty acid chains shorter than or equal to C16), C18 fatty acid alkyl esters (e.g., methyl oleate and methyl linoleate), heavy esters (e.g., FAAE with C20+ fatty acids), glycerin, and unconverted glycerides and unsaponifiable materials. This stream is subjected to glycerin separation and biodiesel distillation as described earlier herein. In the present embodiment, the distillation is carried out such that a biodiesel distillate comprising mainly of C18 fatty acid esters is recovered for use in compression ignition engines, as heating oil, or as an electric generator fuel. Although the biodiesel product comprises the C18 fatty acids from the unconventional lipid, it fully conforms to the ASTM D6751-18 biodiesel specification including T90 value of 360° C. *maximum* as measured by standard test method (ASTM D1160-15).

The distillation bottoms fraction in the present embodiment comprises C20+ fatty acid FAAE, unconverted glycerides (mono-, di-, and triglycerides), and unsaponifiables described previously in this disclosure. In some embodiments, the distillation bottoms comprises at least 15 wt % C20+ fatty acid FAAE. In some embodiments, the distillation bottoms C20+ fatty acid FAAE content is between 15 and 90 wt %.

The distillation bottoms are subsequently subjected to hydrodeoxygenation as described previously when referring to FIG. 3 in general and to the HDO reactor system therein (reference item 300) in particular. The HDO product in the present embodiment comprises n-paraffins from the hydrodeoxygenation of the unconventional lipid's fatty acid (via the C20+ fatty acid FAME intermediate). The hydrodeoxygenation of the distillation bottoms thus produces an oxygen-diminished product comprising less than 0.1 wt % oxygen, at least 90% saturated hydrocarbons (paraffins; isoparaffins, and cycloparaffins combined), less than 5% olefinic hydrocarbons, less than 1% aromatic hydrocarbons. The saturated hydrocarbons comprise C15-C18 n-paraffins and C20+ n-paraffins. In some embodiments, the saturated hydrocarbons comprise C15-C24 n-paraffins. In some embodiments, the oxygen-diminished product comprises at least 5 wt % C20+ n-paraffins. In some embodiments, the oxygen-diminished product comprises at least 10 wt % C20+ n-paraffins. In some embodiments, the oxygen-diminished product comprises at least 20 wt % C20+ n-paraffins.

The oxygen-diminished product from hydrodeoxygenation of the distillation bottom is subsequently stripped in unit (308) to remove any gas phase byproducts (310) including C1-C3 hydrocarbons, H2S, NH3, water, CO and CO2. In some embodiments, the stripped hydrocarbon product (309) is subjected to hydrocracking and/or hydroisomerization (312) according to prior art methods to improve the low temperature properties (e.g. cloud point) of the oxygen-diminished product for use as diesel fuel. In some embodiments, the hydrocracked and/or hydroisomerized hydrocarbon (313) is fractionated into renewable diesel/jet fuel, and naphtha fractions. Despite the high concentration of C20+ n-paraffins, the 90% recovery temperature (according to D86-16a method) of the diesel product is 338° C. or less.

In other embodiments of the present invention, the light esters (FAAE with C16 or shorter fatty acid chains as determined by AOCS CE 1-62) are separated as a light distillation cut, with the biodiesel (FAAE with predominantly C18 fatty acids) as a heart-cut. C16 and shorter fatty acids (i.e., light esters) contain a higher proportion of saturated fatty acids than C18 and longer fatty acids and therefore have a detrimental impact on the cold flow properties of the biodiesel. Therefore removal of the light esters improves the biodiesel product. In this embodiment, the light esters and the distillation bottoms may be combined to provide the feedstock for hydrodeoxygenation. In another embodiment, the light esters may be used as the biological feed for the hydrodeoxygenation reactor system for the production of C16 or shorter hydrocarbons.

In other embodiments, a portion or remainder of the distillation bottoms may be used as a feedstock for subsequent biological, chemical or thermal processing, such as microbial digestion, hydroprocessing, pyrolysis, or other processes, to fuels or other valuable compounds.

The invention is illustrated in detail below with reference to the examples, but without restricting it to them.

EXAMPLES

Example 1: Recovery of Unsaponifiable Material from a Biodiesel Production and Purification Process Corn oil from a dry mill ethanol plant was processed in a biodiesel processing facility. The crude corn oil feedstock was bleached and polished to remove minor contaminants and turned into a pretreated feedstock. The FFA was then removed from the pretreated feedstock by way of FFA stripping yielding a fatty acid distillate and a stripped feedstock. The stripped feedstock was converted into crude biodiesel by way of transesterification while the fatty acid distillate was esterified in another location also yielding a crude biodiesel. The crude biodiesel was then dried to remove the alcohol and water and subsequently distilled yielding a purified biodiesel and distillation bottoms.

Example 2: Characterization of Biodiesel Distillation Bottoms

The bottoms fraction (residue) from the distillation of biodiesel was characterized analytically using Gas Chromatography. The results are reported in Table 1.

TABLE 1

Composition of the Example 2 Biodiesel Distillation Bottoms

| Component | Composition (wt %) |
|---|---|
| Steryl Esters | 53.0% |
| Methyl Esters | 15.7% |
| Ethyl Esters | 0.5% |
| Free Sterols | 4.1% |
| Triglycerides | 6.4% |
| Diglycerides | 1.9% |
| Monoglycerides | 1.1% |
| Total Glycerin | 1.4% |

Ultimate analysis conducted on the biodiesel distillation bottoms revealed the elemental composition shown in Table 2.

TABLE 2

CHNSO analytical results for Example 2 biodiesel distillation bottoms

| Element | Composition (wt %) |
|---|---|
| Carbon (C) | 76.7% |
| Hydrogen (H) | 10.9% |
| Nitrogen (N) | 0.1% |
| Sulfur (S) | 0.0% |
| Oxygen (O) | 12.3% |

Example 3: Purification of Free Sterol/Steryl Ester Mixture from Biodiesel Distillation Bottoms Using Acetone 4 mL (4 g) biodiesel distillation bottoms and 10 mL (7.3 g) acetone were added to a 14 mL centrifuge tube. The centrifuge tube was then mixed and centrifuged. After centrifugation, the acetone liquids (9 g) were decanted into a separate 14 mL centrifuge tube. The remaining sludge layer (2.3 g) was then recycled back an extracted again with acetone. 0.5 mL of de-ionized water was added to the acetone liquids in the 14 mL centrifuge tube, mixed and centrifuged. The top-phase liquids were then decanted off yielding a remaining sludge (2.7 g) layer enriched in sterol/sterol ester components as determined by FTIR. Indication of the enriched sterol/sterol ester components of the dried solids was provided by the retention of the 800 $cm^1$ sterol absorbance and the decrease in absorbances at 1742 $cm^1$ and in the 1250 to 1000 $cm^1$ region. The solids from the decanted acetone/water phase demonstrated a decreased absorbance at 800 $cm^1$ and increased absorbances at 1742 $cm^1$ and in the 1250 to 1000 $cm^1$ region.

Example 4: Removal of Esters and Aromatic Components from Free Sterol/Steryl Ester Mixture Recovered from Biodiesel Distillation Bottoms Using Heptane and Methanol 4 mL biodiesel distillation bottoms and 10 mL heptane were added to a 14 mL centrifuge tube. The contents were then mixed and centrifuged. The heptane-soluble liquids were decanted into separate 14 mL centrifuge tube. The remaining sludge layer, now enriched in waxes and aromatic components, was then dried. One aliquot of methanol was then added to the heptane-soluble liquids, mixed, and centrifuged. The resulting layers were then separated. Each layer was then dried and analyzed by FTIR. The solids in the heptane layer retained the sterol absorbances but exhibit diminished absorbances in the ester region. The solids in the methanol layer were diminished in sterol absorbances and retained the ester absorbances relative to the starting biodiesel distillation bottoms.

Example 5: Pretreatment of Biodiesel Distillation Bottoms

Biodiesel distillation bottoms were sourced from a biodiesel production facility operating with a feedstock composition comprised of used cooking oil, inedible corn oil, and brown grease. Crude methyl esters were produced from the lipid feedstock through transesterification in the presence of methanol and a potassium methoxide catalyst. The potassium methoxide catalyst was neutralized with glacial acetic acid to produce potassium acetate salts. The crude methyl esters were distilled in a wiped film evaporator operating at approximately 240° C. and 5.5 Torr vacuum pressure. The yield of biodiesel distillation bottoms was approximately 9 wt % on a distillation feed basis.

The biodiesel distillation bottoms were subjected to a pretreatment process to reduce the concentration of inorganic impurities (e.g., primarily potassium acetate). The first step of the pretreatment process consisted of heating the distillation bottoms to approximately 80-85° C., dosing 5 wt % of 50 wt % aqueous citric acid solution and approximately 5 wt % water, and mixing for approximately 30 minutes in a stirred tank. The mixture was then centrifuged in a 3-phase horizontal centrifuge at approximately 6,000 g-force. Five gallons of the centrifuge light phase, comprised of the washed distillation bottoms, was recovered and analyzed for alkalinity and metals composition. A summary of the first step metals reduction is shown in Table 3.

TABLE 3

Initial (i.e., raw) and Final (i.e., refined) composition of the refined biodiesel distillation bottoms of Example 5.

| Impurity | Raw | Refined | % Reduction |
|---|---|---|---|
| Alkalinity | 60360.33 | 2152.27 | 96% |
| Ca | 145.412 | 2.14 | 99% |
| Fe | 44.812 | 4.77 | 89% |
| K | 2398.74 | 124.23 | 95% |
| Mg | 20.508 | 0.78 | 96% |
| Mn | 1.154 | 0.05 | 96% |
| Na | 34.514 | 2.47 | 93% |
| P | 6.13 | 4.48 | 27% |
| Si | 4.068 | 4.06 | 0% |
| Total Metals | 2655.34 | 142.98 | 95% |

The second step of the pretreatment process consisted of 3 additional water washes. Each wash included the addition of 5 wt % water, shear mixing for 30 seconds at 80° C., and batch centrifugation in a benchtop bucket centrifuge. The oil phase was recovered after centrifugation by pipetting. The impurity loading of the fully refined and washed distillation bottoms is shown in Table 4.

TABLE 4

Impurity loading of the fully refined and washed distillation bottoms of Example 5.

| Impurity | Refined | 3x Wash | % Reduction |
|---|---|---|---|
| Ca | 2.1 | 0.7 | 67% |
| Fe | 4.8 | 0.6 | 87% |
| K | 124.2 | 10.4 | 92% |
| Mg | 0.8 | 0.1 | 83% |
| Mn | 0.1 | 0.0 | 100% |
| Na | 2.5 | 0.3 | 90% |

TABLE 4-continued

Impurity loading of the fully refined and washed distillation bottoms of Example 5.

| Impurity | Refined | 3x Wash | % Reduction |
|---|---|---|---|
| P | 4.5 | 2.5 | 44% |
| Total Metals | 143.0 | 17.7 | 88% |

Example 6: Hydrodeoxygenation of Biodiesel Distillation Bottoms

A biological feed was prepared by blending one part by weight biodiesel biodiesel residue (treated according to Example 5), with 4 parts by weight canola oil, for hydrodeoxygenation (HDO) according to this invention. A 400 cc reactor was loaded with two catalyst beds of equal volume: top bed contained a low activity catalyst (3% base metal on alumina), and the bottom bed containing a high activity NiMo catalyst (18.5% total base metals on alumina). Both catalysts were commercially available petroleum refining catalysts used for hydrodemetalization and hydrodesulfurization respectively. The HDO reactor was configured for liquid feed and hydrogen entering from the top and exiting through the bottom. The catalyst, supplied in base metal oxide form, was sulfided during reactor startup.

The unsaponifiable-rich biological feed was combined with a hydrocarbon diluent. The hydrocarbon diluent was analyzed via GC and found to include 1.18% n-tetadecane, 1.99% n-pentadecane, 15.46% n-hexadecane, 8.11% n-heptadecane, and 65.61% n-octadecane; the balance being minor concentrations of C14-C18 linear olefins/isoparaffins, "C19 plus" and "C13 minus" paraffin/olefins. Sulfur and nitrogen content were 1.15 ppm and 0.61 ppm respectively. Boiling point distribution data of the diluent and the diluted biological feed (measured according to the ASTM D2887-18 Simulated Distillation method) are listed in Table 5.

TABLE 5

Example 6 HDO reactor feed and product properties.

| Test | Unit | Diluent | Diluted Biological Feed | Day 1 Sample | Day 2 Sample | Day 3 Sample |
|---|---|---|---|---|---|---|
| Density @ 15.5° C. | g/mL |  | 0.8263 | 0.7889 | 0.7896 | 0.7899 |
| Nitrogen (ppm) | ppm | 0.6 | 60.0 | 4.9 | <1.0 | <1.0 |
| Sulfur (ppm) | ppm | 1.2 | Note 1 | 3.1 | 2.4 | 1.8 |
| Acid Number | mg KOH/g | — | — | <0.05 | <0.05 | <0.05 |
| SimDist |  |  |  |  |  |  |
| IBP | ° C. | 215.9 | 39.3 | 204.4 | 216.5 | 217.4 |
| 5% | ° C. | 285.9 | 259.2 | 279.4 | 286.6 | 286.7 |
| 10% | ° C. | 287.2 | 282.6 | 287.2 | 287.4 | 287.4 |
| 20% | ° C. | 292.9 | 283.7 | 301.6 | 302.1 | 302.1 |
| 30% | ° C. | 309.6 | 305.4 | 311.2 | 314.3 | 314.8 |
| 40% | ° C. | 316.4 | 312.0 | 315.9 | 316.2 | 316.2 |
| 50% | ° C. | 317.1 | 312.3 | 316.2 | 316.4 | 316.4 |
| 60% | ° C. | 317.6 | 312.6 | 316.5 | 316.7 | 316.6 |
| 70% | ° C. | 318.0 | 313.4 | 316.7 | 316.9 | 316.8 |
| 80% | ° C. | 318.3 | 479.6 | 316.9 | 317.1 | 317.1 |
| 90% | ° C. | 318.7 | 560.1 | 317.3 | 317.4 | 317.5 |
| 90% | ° C. | 318.9 | 594.0 | 343.3 | 347.0 | 368.1 |
| FBP | ° C. | 452.3 | 626.9 | 470.3 | 475.7 | 478.4 |

Note 1:
The biodiesel distillation bottoms had 130 ppm sulfur prior to dilution; the diluted feed was spiked with 350 ppm sulfur (as dimethyl disulfide).

The HDO reaction conditions for the three-day continuous run are listed in Table 6.

TABLE 6

Example 6 HDO operating conditions

| Parameter | Operating Condition |
|---|---|
| Temperature | 600° F. (316° C.) |
| Pressure | 1800 psig |
| Liquid Hourly Space Velocity | 1.0 h$^{-1}$ |
| Hydrogen-to-Liquid Feed Ratio | 5000 SCF/bbl |

The reactor effluent was cooled and transferred to a high pressure separator, where a hydrogen-rich bleed gas was separated from the effluent, before the liquid was processed through an atmospheric-pressure stripper column. The flow and composition of the gas/vapor streams from both the high pressure separator and the stripper column was measured with wet gas meters and online GC analyzers. The gas stream composition showed presence of 1-2 mol % CO2 along with 5-10 mol % C1-C6+ hydrocarbons. The stripper column liquid was collected in an accumulator where it was drained every 8-hours. These 8-hr composite samples were analyzed at least once a day for boiling point distribution (ASTM D2887-18), density, sulfur, nitrogen, and acid number. The results are presented in Table 5.

The Table 5 boiling point distribution results for reactor feed and products are also presented graphically in FIG. 4.

The reduction in density from 0.8263 to 0.7889-0.7899 indicates substantial removal of oxygen. This is supported by below detection acid number in all the product samples. A reduction in high molecular weight species is also observed from the boiling point distribution data (ASTM D2887-18 analyses). FIG. 4 indicates a reduction in 400° C.+ fraction from 25% to less than 5%. Since the biodiesel distillation bottoms comprise most the high molecular weight/heavy boiling species, these results indicate a substantial conversion of the biodiesel distillation bottoms comprising unsaponifiable materials.

Example 7: Hydroisomerization of Biodiesel Distillation Bottoms HDO Product

The deoxygenated products of Example 6 were combined and tested for low temperature properties. The cloud point was found to be 26° C. and the pour point was measured as 21° C.

In order to improve the low temperature properties for diesel fuel applications, the hydrocarbon was subjected to hydroisomerization. A pilot plant tubular reactor was filled with a bifunctional isomerization catalyst with a zeolite-containing silica alumina support providing acid functionality, and a Pt/Pd noble metal combination providing hydrogenation-dehydrogenation activity. The reaction parameters are listed below in Table 7.

TABLE 7

Example 7 hydroisomerization operating conditions.

| Parameter | Operating Condition |
|---|---|
| Liquid Hourly Space Velocity | 1.15 h$^{-1}$ |
| Temperature | 594° F. |
| Pressure | 990 psig |
| Hydrogen-to-Liquid Feed Ratio | 3,100 SCF/bbl |

The yield (vol hydroisomerized diesel per vol of hydroisomerizer feed) was 97%. Selected quality parameters for the hydroisomerized diesel fraction are listed below in Table 8.

TABLE 8

Selected quality parameters for Example 7 hydroisomerized diesel fraction.

| Quality Parameter | Result |
|---|---|
| Cloud Point | −12.5° C. |
| Pour Point | −18° C. |
| Freeze Point | −10.1° C. |
| Flash Point | 85° C. |

As a result of the high degree of variability in the identity and quantity of unsaponifiable material found in feedstocks for biodiesel, particularly lower-cost crude feedstocks, a number of process steps as disclosed in the embodiments of the invention may be employed as disclosed herein to convert highly, impure feedstocks into high quality and fully acceptable biodiesel and valuable chemicals from unsaponifiable material. These various embodiments are described in sufficient detail to enable one of ordinary skill in the art to practice the invention, and it is to be understood that modifications to the various disclosed embodiments may be made by a skilled artisan. Where methods and steps described above indicate certain events occurring in certain order, those of ordinary skill in the art will recognize that the ordering of certain steps may be modified and that such modifications are in accordance with the principles of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above provide an indication of the utility and versatility of the present invention. Other embodiments that do not provide all of the features and advantages set forth herein may also be utilized, without departing from the spirit and scope of the present invention. Such modifications and variations are considered to be within the scope of the principles of the invention defined by the claims.

What is claimed is:

1. A process for producing hydrocarbons from a biological feedstock comprising:
   a. subjecting the biological feedstock to a pre-treatment process comprising:
      i. heating the biological feedstock to a temperature above ambient temperature;
      ii. adding an aqueous acid solution to the heated biological feedstock and mixing to produce a mixture; and
      iii. separating the mixture to produce a refined biological feedstock;
   wherein the biological feedstock comprises a distillation bottoms recovered from a biodiesel distillation process, the distillation bottoms comprising unsaponifiable material at a concentration greater than 2 wt %, and the refined biological feedstock has a reduced concentration of inorganic impurities and reduced alkalinity compared to the biological feedstock;
   b. diluting the refined biological feedstock with a hydrocarbon oil to produce a diluted biological feedstock;
   c. subjecting the diluted biological feedstock to a hydrodeoxygenation process comprising contacting the diluted biological feedstock with a hydrogen-rich gas and a catalyst at a temperature and pressure which are elevated above an ambient temperature and pressure to produce a reactor effluent; and
   d. recovering a hydrocarbons fraction from the reactor effluent.

2. The process of claim 1 wherein the biological feedstock comprises free fatty acids and fatty acid glyceride esters.

3. The process of claim 1 wherein the temperature is between about 260 C and 371 C and the pressure is between about 500 and 2,500 psig.

4. The process of claim 1 wherein the biological feedstock comprises at least 20 wt % high molecular weight components.

5. The process of claim 4 wherein the high molecular weight components are indicated by 20 wt % boiling above about 400° C. according to at least one of ASTM D2887-18 or ASTM D7169-11 measured on the diluted biological feedstock.

6. The process of claim 1 wherein the hydrocarbon oil comprises C15, C16, C17, and C18 n-paraffins.

7. The process of claim 1 wherein the hydrocarbon oil is a petroleum fraction.

8. The process of claim 1 wherein the reactor effluent comprises less than 5 wt % hydrocarbons boiling above 380° C. according to ASTM D2887-18.

9. The process of claim 1 wherein the reactor effluent comprises hydrocarbons with acid number below 0.05 mg KOH/g.

10. The process of claim 1 wherein the biodiesel distillation process purifies biodiesel made by at least one of transesterification and esterification of a lipid feedstock comprised of greater than 10 wt % of an unconventional lipid, wherein the unconventional lipid comprises at least 20 wt % C20+ fatty acids.

11. The process of claim 1 wherein the distillation bottoms comprises at least 15 wt % C20+ fatty acid alkyl esters.

12. The process of claim 1 wherein the biological feedstock comprises unsaponifiable material at a concentration greater than 3 wt %.

13. The process of claim 1 wherein the biological feedstock comprises unsaponifiable material at a concentration greater than 4 wt %.

14. The process of claim 1 wherein the pretreatment process further comprises water washing the biological feedstock to produce the refined biological feedstock.

15. The process of claim 1 wherein the pretreatment process reduces the Alkalinity by at least 80%.

16. The process of claim 1 wherein the catalyst in the hydrodeoxygenation process includes a first catalyst bed having a first activity and a second catalyst bed having a second activity, and the first activity is lower than the second activity, wherein the hydrodeoxygenation process further includes subjecting the diluted biological feedstock to the first catalyst bed before subjecting the diluted biological feedstock to the second catalyst bed.

17. A process for producing hydrocarbons from a biological feedstock comprising:
  a. subjecting the biological feedstock to a pre-treatment process comprising:
    i. heating the biological feedstock to a temperature above ambient temperature;
    ii. adding an aqueous acid solution to the heated biological feedstock and mixing to produce a mixture; and
    iii. separating the mixture to produce a refined biological feedstock;
  wherein the biological feedstock comprises a distillation bottoms recovered from a biodiesel distillation process, the distillation bottoms comprising unsaponifiable material at a concentration greater than 2 wt % and a fatty acid alkyl ester fraction comprising greater than 40 wt % C16 and shorter carbon fatty acid chains, and the refined biological feedstock has a reduced concentration of inorganic impurities and reduced alkalinity compared to the biological feedstock;
  b. diluting the refined biological feedstock with a hydrocarbon oil to produce a diluted biological feedstock,
  c. subjecting the diluted biological feedstock to a hydrodeoxygenation process comprising contacting the diluted biological feedstock with a hydrogen-rich gas and a catalyst at a temperature and pressure which are elevated above an ambient temperature and pressure to produce a reactor effluent; and
  d. recovering a hydrocarbons fraction from the reactor effluent.

18. The process of claim 17 wherein the temperature is between about 260 C and 371 C and the pressure is between about 500 and 2,500 psig.

19. The process of claim 17 further comprising separating the reactor effluent into a hydrocarbon phase, a gas phase, and an aqueous phase and using a hydrocarbon stripper to separate the hydrocarbon phase into an overheads fraction and the hydrocarbons fraction.

20. The process of claim 17 further comprising adding the hydrocarbons fraction to a diesel fuel.

21. The process of claim 17 further comprising introducing the hydrocarbons fraction to at least one of a hydrocracking and hydroisomerization process to produce a renewable diesel fuel.

22. The process of claim 17 wherein the biological feedstock comprises unsaponifiable material at a concentration greater than 3 wt %.

23. The process of claim 17 wherein the biological feedstock comprises unsaponifiable material at a concentration greater than 4 wt %.

24. A process for producing a purified biodiesel from a feedstock containing unsaponifiable material, said method comprising:
  a. introducing the feedstock to a first pre-treatment process to produce a pretreated feedstock;
  b. introducing the pretreated feedstock to a FFA refining process to produce a refined feedstock;
  c. reacting the refined feedstock in a transesterification reactor with an alcohol to produce a crude biodiesel;
  d. purifying the crude biodiesel by distillation to produce a purified biodiesel and a distillation bottoms having a concentration of inorganic impurities;
  e. subjecting the distillation bottoms to a second pre-treatment process comprising:
    i. heating the distillation bottoms to a temperature above ambient temperature;
    ii. adding an aqueous acid solution to the heated distillation bottoms and mixing to produce a mixture; and
    iii. separating the mixture to produce a refined biological feedstock;
  wherein the distillation bottoms comprise unsaponifiable material at a concentration greater than 2 wt %, and the refined biological feedstock has a reduced concentration of inorganic impurities and reduced alkalinity compared to the biological feedstock;
  f. diluting the refined biological feedstock with a hydrocarbon oil to produce a diluted biological feedstock;
  g. subjecting the diluted biological feedstock to a hydrodeoxygenation process by contacting the diluted biological feedstock with a hydrogen-rich gas and a catalyst at a temperature and pressure which are elevated above an ambient temperature and pressure to produce a reactor effluent;
  h. recovering a hydrocarbons fraction from the reactor effluent.

25. The process of claim 24 further comprising separating the reactor effluent into a hydrocarbon phase, a gas phase, and an aqueous phase and using a hydrocarbon stripper to separate the hydrocarbon phase into an overheads fraction and the hydrocarbons fraction.

26. The process of claim 24 further comprising adding the hydrocarbons fraction to a diesel fuel.

27. The process of claim 24 further comprising introducing the hydrocarbons fraction to at least one of a hydrocracking and hydroisomerization process to produce a renewable diesel fuel.

28. The process of claim 24 wherein the pretreatment process further comprises water washing the distillation bottoms to produce the refined distillation bottoms.

29. The process of claim 24 wherein the pretreatment process reduces the Alkalinity by at least 80%.

30. The process of claim 24 wherein the catalyst in the hydrodeoxygenation process includes a first catalyst bed having a first activity and a second catalyst bed having a second activity, and the first activity is lower than the second activity, wherein the hydrodeoxygenation process further includes subjecting the diluted biological feedstock to the first catalyst bed before subjecting the diluted distillation bottoms to the second catalyst bed.

31. A process for producing stripped hydrocarbons from a biological feedstock comprising:
  a. subjecting the biological feedstock to a pre-treatment process comprising:
    i. heating the biological feedstock to a temperature above ambient temperature;
    ii. adding an aqueous acid solution to the heated biological feedstock and mixing to produce a mixture; and
    iii. separating the mixture to produce a refined biological feedstock;
  wherein the biological feedstock comprises a distillation bottoms recovered from a biodiesel distillation process, the distillation bottoms comprising unsaponifiable material at a concentration greater than 2 wt %, and the refined biological feedstock has a reduced concentration of inorganic impurities and reduced alkalinity compared to the biological feedstock;
  b. diluting the refined biological feedstock with a hydrocarbon oil to provide a diluted biological feedstock;
  c. subjecting the diluted biological feedstock to a hydrodeoxygenation process by contacting the diluted biological feedstock with a hydrogen-rich gas and a catalyst at a temperature and pressure which are elevated above an ambient temperature and pressure to produce a reactor effluent;
  d. separating the reactor effluent into a hydrocarbon phase, a gas phase, and an aqueous phase;
  e. using a hydrocarbon stripper to separate the hydrocarbon phase into a stripper overheads fraction and a stripped hydrocarbons fraction.

32. The process of claim 31 wherein the biological feedstock comprises free fatty acids and fatty acid glyceride esters.

33. The process of claim 31 wherein the temperature is between about 260 C and 371 C and the pressure is between about 500 and 2,500 psig.

34. The process of claim 31 further comprising adding the stripped hydrocarbons fraction to a diesel fuel.

35. The process of claim 31 further comprising introducing the stripped hydrocarbons fraction to at least one of a hydrocracking and hydroisomerization process to produce a renewable diesel fuel.

36. The process of claim 31 wherein the biological feedstock comprises unsaponifiable material at a concentration greater than 3 wt %.

37. The process of claim 31 wherein the biological feedstock comprises unsaponifiable material at a concentration greater than 4 wt %.

* * * * *